US007432926B1

United States Patent
Cherkas

(10) Patent No.: US 7,432,926 B1
(45) Date of Patent: Oct. 7, 2008

(54) COMPLETE FUNCTION GRAPHING SYSTEM AND METHOD

(76) Inventor: Barry M. Cherkas, 175-38 Henley Rd., Jamaica, NY (US) 11432-2933

( * ) Notice: Subject to any disclaimer, the term of this patent is extended or adjusted under 35 U.S.C. 154(b) by 270 days.

(21) Appl. No.: 11/273,495

(22) Filed: Nov. 14, 2005

Related U.S. Application Data

(60) Provisional application No. 60/630,697, filed on Nov. 23, 2004.

(51) Int. Cl.
    *G06T 11/00* (2006.01)
(52) U.S. Cl. .................................................. 345/440
(58) Field of Classification Search .................. None
    See application file for complete search history.

(56) References Cited

U.S. PATENT DOCUMENTS 5,530,942 A * 6/1996 Tzou et al. ................. 715/512

OTHER PUBLICATIONS

"TI-83 Graphing Calculator Guidebook," 2001, pp. 3-5, 3-7, 3-18, 3-19, 3-22, 4-4, 5-3, 16-4, 18-2, B-5-B-9.*

Wolfram, Stephan, "The Mathematica Book, Second Edition," 1991, pp. 162-167.*
Barry Cherkas, *Preparing for Calculus Using Mathematica; A Laboratory Approach*, Preliminary Edition, Cherkas Software Consultants, Inc., 2001.
Lesson 25: Curve Sketching in APCalculus by Jim Choike, 1999.
Free Online MIT Course Materials for High School | AP Calculus | Applications of Derivatives | Analysis of Curves | MIT OpenCourseWare, Copyright 2002-2008 MIT.
Lab: Finding Complete Graphs of Polynomial Functions, Jay Abramson, 2001, http://math.asu.edu/fym/GraphCal/Cassio/ch2/Lab_Polynomials.htm.
Person, Special Edition Using Microsoft Excel 97, Dec. 17, 1996.
OA mailed May 12, 2008, for U.S. Appl. No. 11/284,547, entitled Function Graphing System and Method, filed Nov. 22, 2005, CIP of current application, by current applicant.

* cited by examiner

*Primary Examiner*—Ulka Chauhan
*Assistant Examiner*—Andrew Yang
(74) *Attorney, Agent, or Firm*—Burns & Levinson, LLP; Jacob N. Erlich, Esq.; Kathleen Champan, Esq.

(57) ABSTRACT

A system and method for graphing mathematical features of a given function within an optimum viewing window. The system and method can also highlight the mathematical features. Further, for example, the system and method can determine the various behaviors of the function and highlight curve segments of concavity, increase/decrease, and where the function is constant.

29 Claims, 17 Drawing Sheets

COMPLETE FUNCTION GRAPHING SYSTEM AND METHOD

CROSS REFERENCE TO RELATED APPLICATIONS

The present application claims priority to U.S. Provisional Application No. 60/630,697 filed Nov. 23, 2004 entitled FUNCTION GRAPHING SYSTEM AND METHOD which is incorporated herein in its entirety by reference.

BACKGROUND OF THE INVENTION

The present invention relates generally to function graphing and, more specifically, to automatic determination of optimum graph characteristics.

Mathematical functions can be classified as either algebraic or transcendental (nonalgebraic). Algebraic functions are expressions that involve only the algebraic operations of addition, subtraction, multiplication, division, raising to an integer power, and extracting an odd number root or even number root. In terms of graphing, a key difference that distinguishes algebraic functions from transcendental functions is that algebraic functions have a finite number of points of mathematical interest such as: intercepts, extrema, points of inflection, holes, vertical asymptotes, horizontal asymptotes, slant asymptotes, points of discontinuity, isolated points, vertical tangents, vertical cusps, and corners. Transcendental functions, on the other hand, which include the trigonometric functions, can have an infinite number of points of mathematical interest. This means that graphs of algebraic functions are capable of being displayed in a complete graph—one that includes all their points of mathematical interest.

Software packages and many graphing calculators use algorithms that could display complete graphs of functions if the selection of function-specific graphing settings such as x-dimension values and y-dimension values were appropriate. Further, if all the important mathematical features, together with standard auxiliary graphics for illuminating singularities (holes, discontinuities, isolated points, and the various kinds of asymptotes), could be provided for in the function-specific settings, significant features could be more clearly apparent.

What is needed is a system and method to provide an electronic graph of a function in which important mathematical features of the function, including singularities, are clearly apparent, for example, but not limited to, within an optimum viewing window, for example, but not limited to, on a graphing calculator, a personal computer display, a hand-held computer, or other type of electronic display. Further, a system and method are needed to provide an efficient way for a user to view mathematical features of a pre-selected function.

SUMMARY OF THE INVENTION

The problems set forth above as well as further and other problems are solved by the present invention. These solutions and other advantages are achieved by the various embodiments of the invention described herein below.

The present invention includes a system and method for optimally graphing functions. The graphing device for enabling the system and method of the present invention may be any type of electronic display, for example, a graphing calculator. The method of the present invention can include, but is not limited to, the steps of accepting a function, error-checking each accepted user entry, determining the type of function entered, determining the domain of the function entered, determining mathematical features of interest with respect to the accepted function, and determining an optimum viewing window that can include all the mathematical features of interest. The method can further include the steps of highlighting particular curve segments, for example by color-coding them, to assist visual analysis, and plotting the highlighted curve segments in the optimum viewing window. Optionally, the method can include the steps of resizing the optimum viewing window upon user request, preparing tabular displays for numerical values of important mathematical features in both approximate and symbolic (exact) values, when appropriate, and displaying appropriate scales on the graph. The method can further optionally include the steps of determining a function type context, which allows specific user entry for the function type, and error-checking each accepted user entry based on the function type context.

The system of the present invention can include, but is not limited to, a user entry subsystem, a features subsystem, and a window subsystem, which together can implement the method of the present invention. The system of the present invention can optionally include subsystems (1) to customize the default values in the system, (2) to guide user entry based on function type, and (3) to check for entry errors during function processing.

The highlighted graphs of the present invention can help users to better visualize the properties of increasing/decreasing and concave up/concave down for a given function, each property highlighted on a separate graph. In addition, peaks and valleys (extrema) can be inferred at the junctures between increasing/decreasing segments that are highlighted in a way that distinguishes those segments from one another. Similarly, changes in concavity can be inferred at the junctures between concave up/concave down segments that are highlighted in a way that distinguishes them from one another. Resizing in the vicinity of the juncture when a graph is flat, entering only x-dimension values and permitting automatic determination of optimum y-dimension values can enable the user to visually verify the existence of a peak or valley as well as a change in concavity. For a better understanding of the present invention, reference is made to the accompanying drawings and detailed description.

DETAILED DESCRIPTION OF THE INVENTION

The present invention is a system and method for optimally graphing algebraic functions. All examples provided herein are illustrative of aspects of the invention and not for limiting the uses of the invention.

Figure 1:
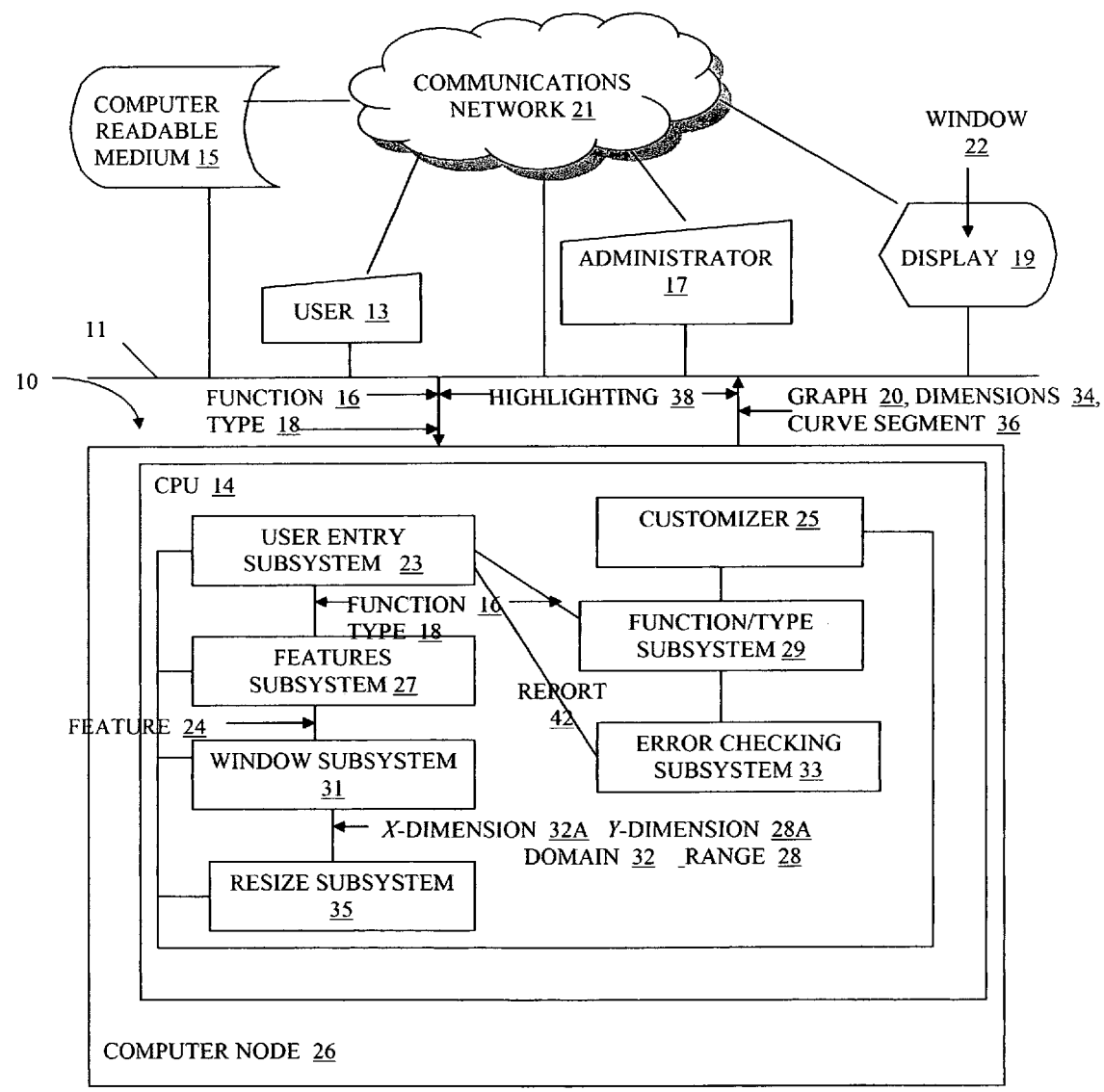
FIG. 1 is a schematic block diagram of the computer environment and interfaces of the system of the present invention.

Referring now to FIG. 1, system 10 can include, but is not limited to, user entry subsystem 23, features subsystem 27, and window subsystem 31. Optionally, system 10 can include resize subsystem 35, customizer 25, function/type subsystem 29, and error checking subsystem 33. System 10 can execute in a variety of environments, from a calculator to at least one computer node 26 within a communications network 21. System 10 can interoperate with display 19, which can interface with CPU 14 that can execute system 10. CPU 14 can also interconnect with communications network 21 through electronic interface 11. Window subsystem 31 can display graph 20 within window 22 on display 19, and/or save graph 20 on at least one computer readable medium 15, which can also interface with CPU 14 through electronic interface 11 and/or through communications network 21.

Figure 13:
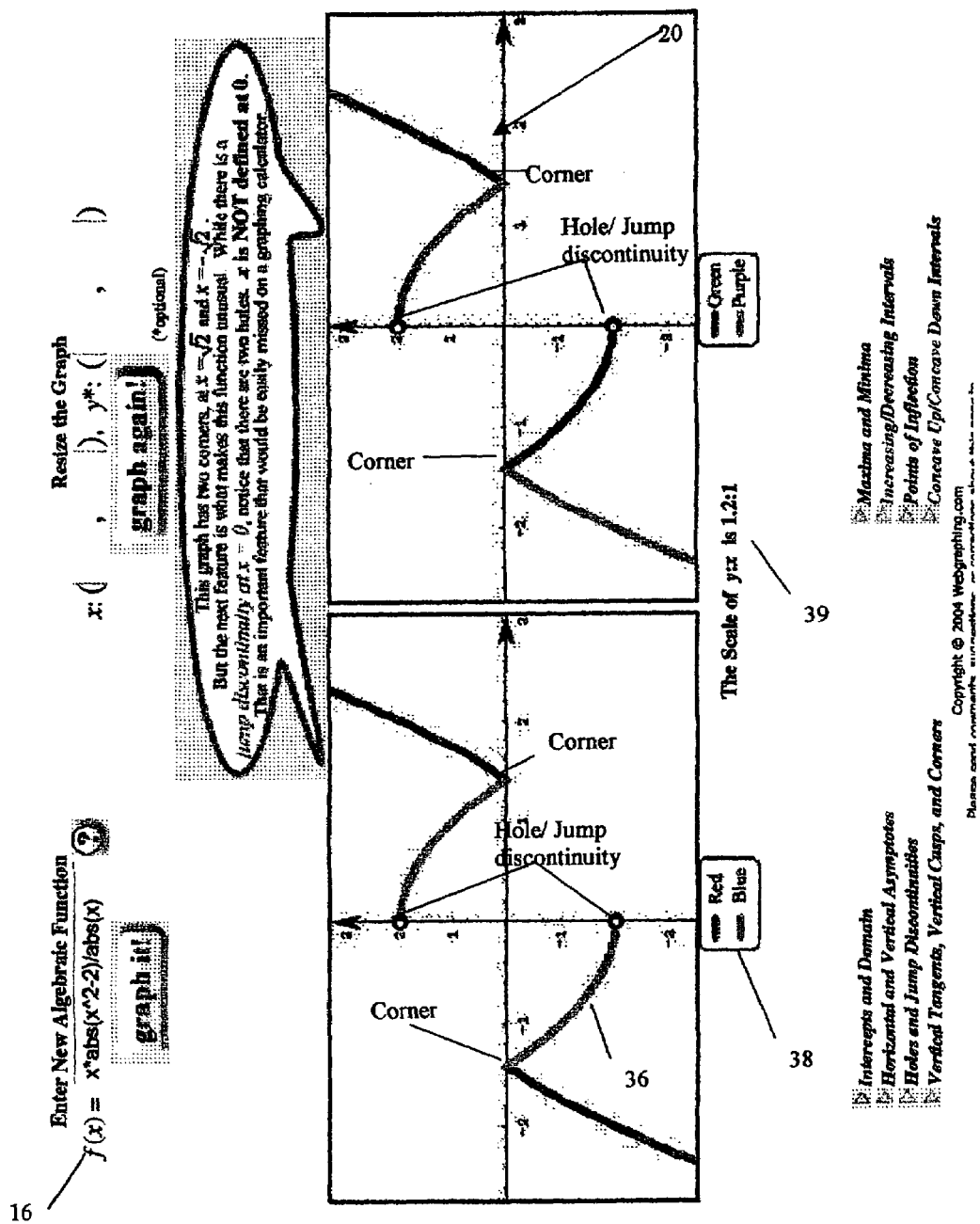
FIG. 13 is a screen view of a complete graph of an algebraic function having corners, a jump discontinuity, and holes presented according to the system and method of the present invention.

Continuing to refer to FIG. 1, operationally, user 13 and/or administrator 17 can provide information through user entry subsystem 23. The information can be used by system 10 to build, highlight, and display graph 20. User 13 can provide function 16 and type 18 through user entry subsystem 23 to function/type subsystem 29. Optionally, administrator 17 can provide additions/updates to system defaults such as, for example, type 18 and highlighting 38. After function 16 has been entered according to type 18, features subsystem 27 can determine at least one mathematical feature 24 and provide it to window subsystem 31. Window subsystem 31 can determine, from the at least one mathematical feature 24, the dimensions 34 of graph 20 that would include as many as all the at least one mathematical features 24. Window subsystem 31 can also determine at least one curve segment 36, if possible, and select appropriate highlighting 38 for the at least one curve segment 36, if one is found. When window subsystem 31 is unable to determine at least one curve segment 36, for example because calculations can take too long, window subsystem 31 can provide, for example, a single color curve that can include other mathematical features such as, for example, asymptotes and holes (FIG. 13). Window subsystem 31 can provide graph 20, dimensions 34, at least one curve segment 36, if possible, and highlighting 38 to display 19, which can display window 22 containing graph 20. Customizer 25 can allow administrator 17 to add or update, for example, but not limited to, types 18 and/or highlighting 38. Function/type subsystem 29 can allow user 13 to specify type 18, for example, but not limited to, polynomial, algebraic, or rational. Function/type subsystem 29 can provide an association between type 18 and function 16 to assist user 13 in proper function entry. Function/type subsystem 29 can also provide an association between type 18 and at least one mathematical feature 24. Error checking subsystem 33 can use, for example, type 18, to verify that function 16 is properly entered. Error checking subsystem 33 can check the syntax of function 16, and can inform user 13 of errors. Error checking subsystem 33 can also provide at least one report 42 of at least one error to user entry subsystem 23. Continuing to further refer primarily to FIG. 1, system 10 can process entered functions 16 as follows. For polynomial functions, window subsystem 31 can determine an optimum viewing window 22 with dimensions 34. All points corresponding to zeros of $f$, $f'$ and $f''$ are included in the optimum viewing window 22. This is accomplished by finding all pairs of x- and y-coordinates for up to all the important at least one mathematical features 24: intercepts, extrema, and points of inflection. These coordinates can be fit into a viewing window 22 above and below the maximum and minimum x- and y-coordinates by, for example, 10% of the smallest window 22 that includes all the important at least one mathematical features 24. If there is only one such pair of coordinates (there must be at least one for the y-intercept), a convenient value, for example, 1 unit above and 1 unit below can be selected. For polynomials, the domain 32 is always $(-\infty, \infty)$. Range 28 of polynomial function 16 can be determined based on the degree of the polynomial; for example, odd degree polynomials have a range 28 of $(-\infty, \infty)$. To determine the form of the range 28, window subsystem 31 can determine the sign of the leading coefficient of the polynomial $a_n$, and can perform the following tests: (1) if the leading coefficient is positive, range 28 can be in the form $[f(x_m), \infty)$, where $f(x_m)$ is the global minimum value amongst all values in the set $\{f(x_m)\}$, where $f'(x_m)=0$; (2) if the leading coefficient is negative, range 28 can be in the form $(-\infty, f(x_m)]$, where $f(x_m)$ is the global maximum value amongst all values in the set $\{f(x_m)\}$, where $f'(x_m)=0$. The plotting interval of x-coordinates can be adjusted so that, for example, the curve can extend across the display 19. The resulting viewing window 22 is optimum in the sense that it can include all the important at least one mathematical features 24 of a polynomial function 16 (intercepts, extrema, and points of inflection), can extend the curve horizontally across the display 19, and does not flatten out peaks and valleys unnecessarily by having too large a plotting y-dimension 28A.

Continuing to still further refer to FIG. 1, to determine an optimum viewing window 22 for a rational function, window subsystem 31 can find all pairs of x- and y-coordinates for all the important at least one mathematical features 24: intercepts, extrema, points of inflection, and holes (FIG. 13). Also, when vertical asymptotes are present, additional coordinates are included in the viewing window where the slope of the function in absolute value is large, say for example, 81. Further, when a horizontal asymptote is present, additional coordinates can be included in the viewing window where the slope in absolute value is relatively small, for example, 1/50. When a slant or quadratic or cubic or other higher degree polynomial asymptote is present, additional coordinates are included in the viewing window to display the important features of that polynomial as, for example, dashed lines in the viewing window. Additional analyses can determine if improper cancellation creates anomalies. For example, the expression $$\frac{x-1}{x-1}$$

could be improperly evaluated as a value of 1, whereas the correct evaluation is the constant function 1 with a hole at the coordinate (1, 1). The domain 32 of a rational function 16 is all real numbers except for zeros of its denominator.

Figure 12:
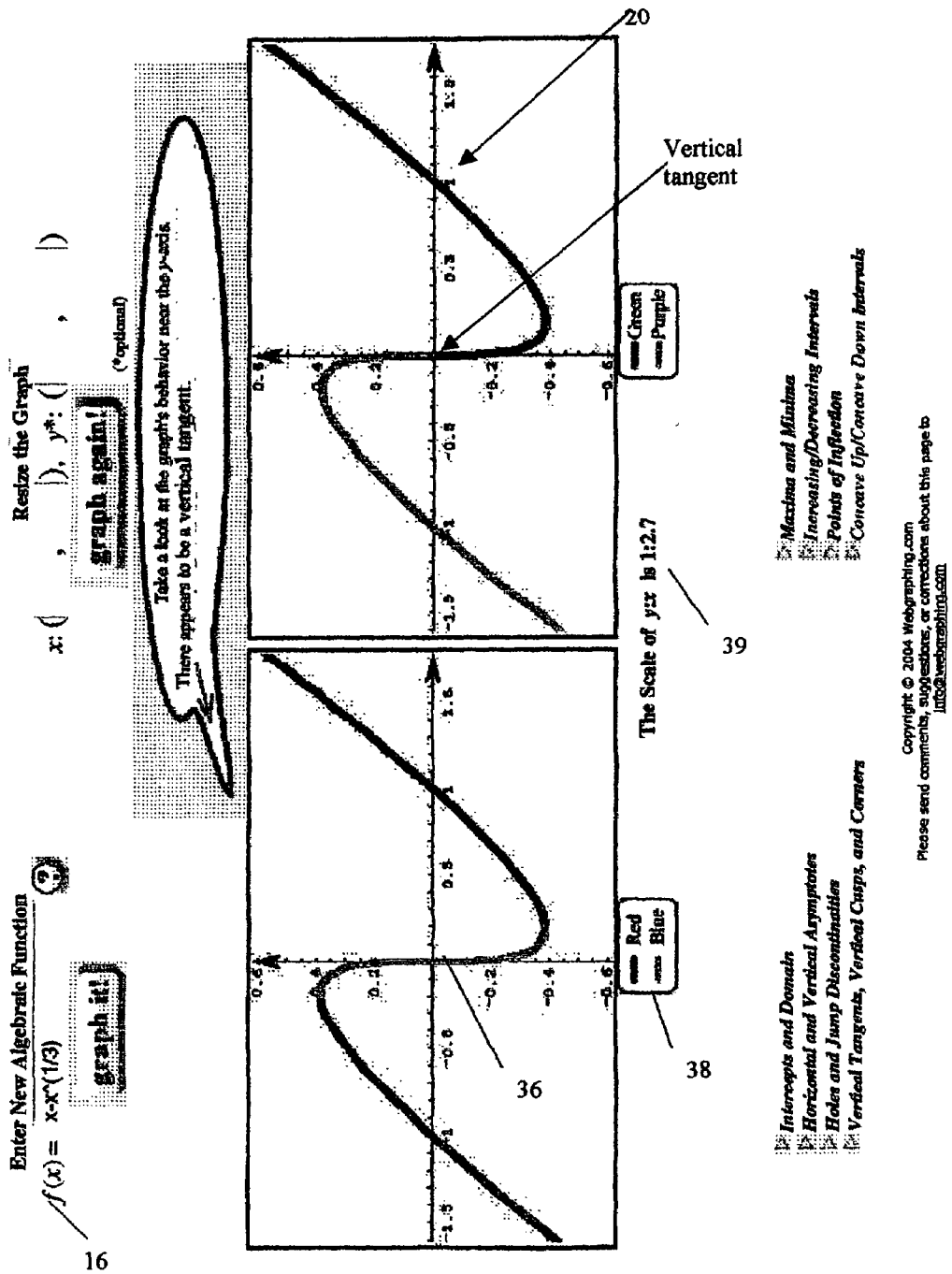
FIG. 12 is a screen view of a complete graph of an algebraic function having a vertical tangent presented according to the system and method of the present invention.

Continuing to still further refer to FIG. 1, to determine an optimum viewing window 22 for an algebraic function, in addition to the coordinates found in the case of rational functions, window subsystem 31 can also include coordinates for any finite domain endpoints and isolated points (FIG. 14) when isolated points are present, jump discontinuities (FIG. 13) when jump discontinuities are present, vertical cusps (FIG. 15) when they are present, vertical tangents (FIG. 12) when they are present, and corners (FIG. 13) when they are present. Note that for general algebraic functions, it is possible that there are no important mathematical features at all. This could happen, for example, if the function $f(x)=\sqrt{x-1}+\sqrt{2-x}$ were entered since it has no domain 32; that is, there is no value of x for which the function is real, so there should be no graph 20 delivered. (Strictly speaking, the empty set is a function.) Other anomalies include having only a finite number of isolated points (no curve) to plot, as is the case, for example, when $f(x)=2+\sqrt{(x^2-1)(1-x^2)}$ which is real-valued only when $x=\pm 1$. In this case, the only points to plot are isolated points with coordinates $\{(-1, 2),(1, 2)\}$. Additional analyses can determine if improper cancellation creates anomalies. For example, the expression $$\frac{\sqrt{x^2-1}}{\sqrt{x^2-1}}$$

could be improperly evaluated as a value of 1, whereas the correct evaluation is the constant function 1 for $|x|>1$, with holes at the coordinates $(-1, 1)$ and $(1, 1)$. The domain 32 of an algebraic function 16 is all real numbers except for zeros of its denominator and negative values of radicands of even roots.

Figure 2:
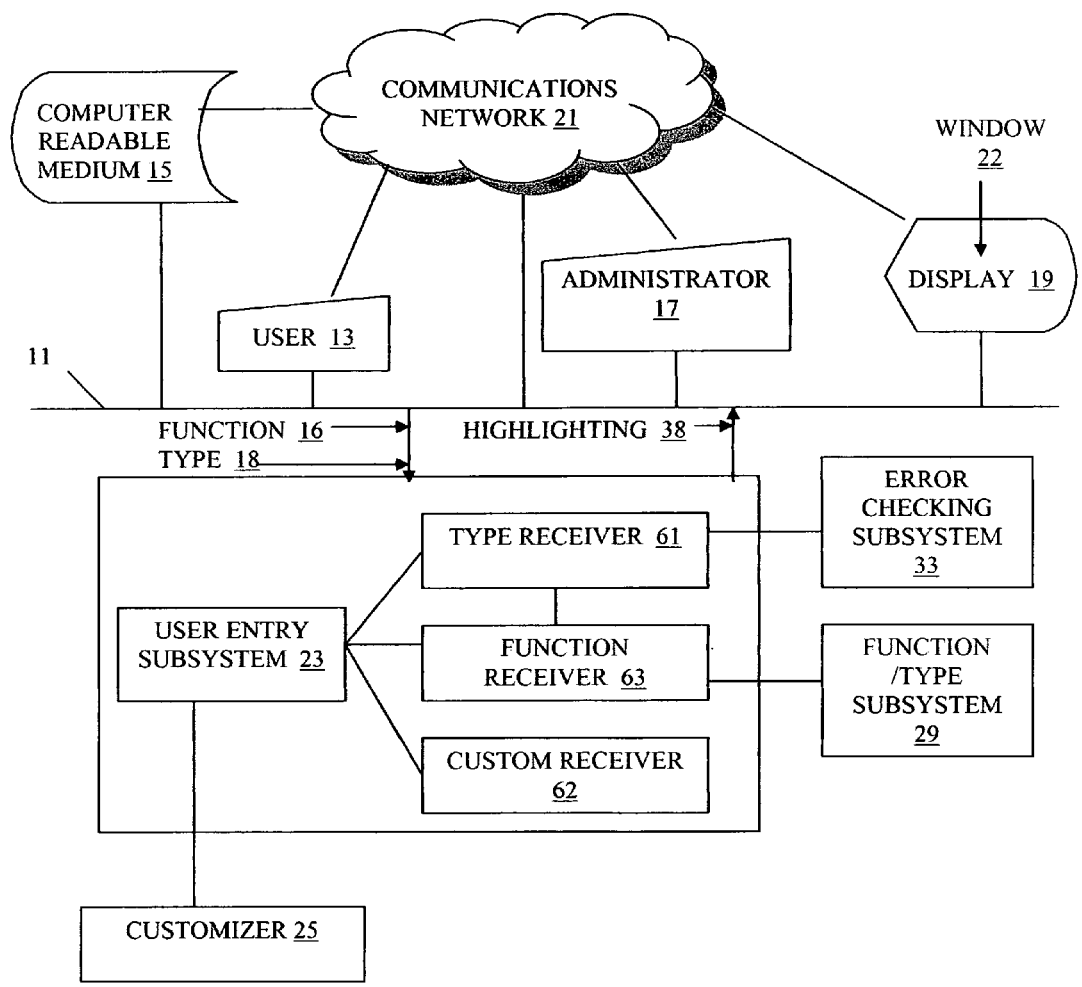
FIG. 2 is a schematic block diagram of the components of the user entry subsystem.
Figure 11:
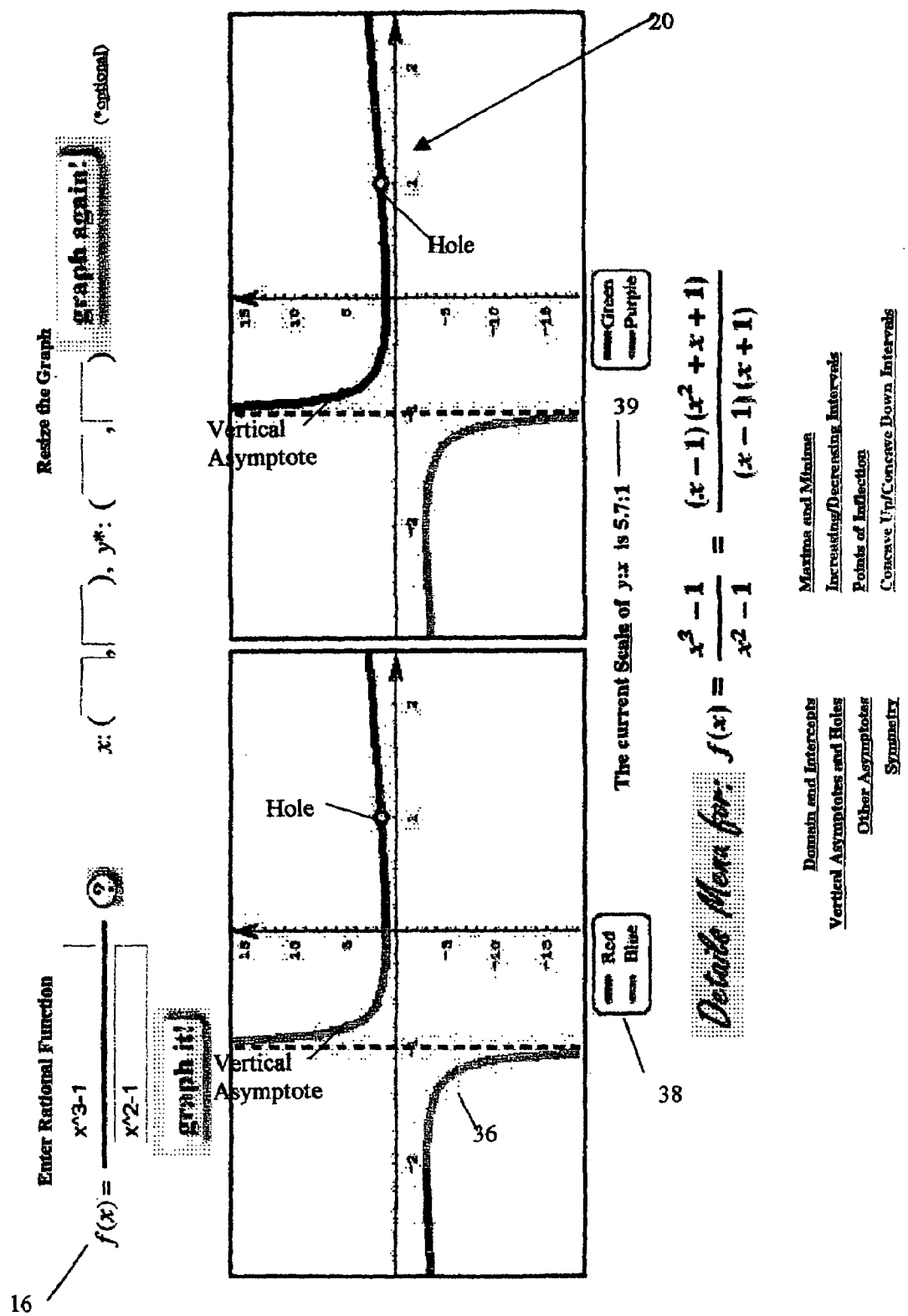
FIG. 11 is a screen view of the complete graph of a rational function having a vertical asymptote and a hole presented according to the system and method of the present invention.
Figure 14:
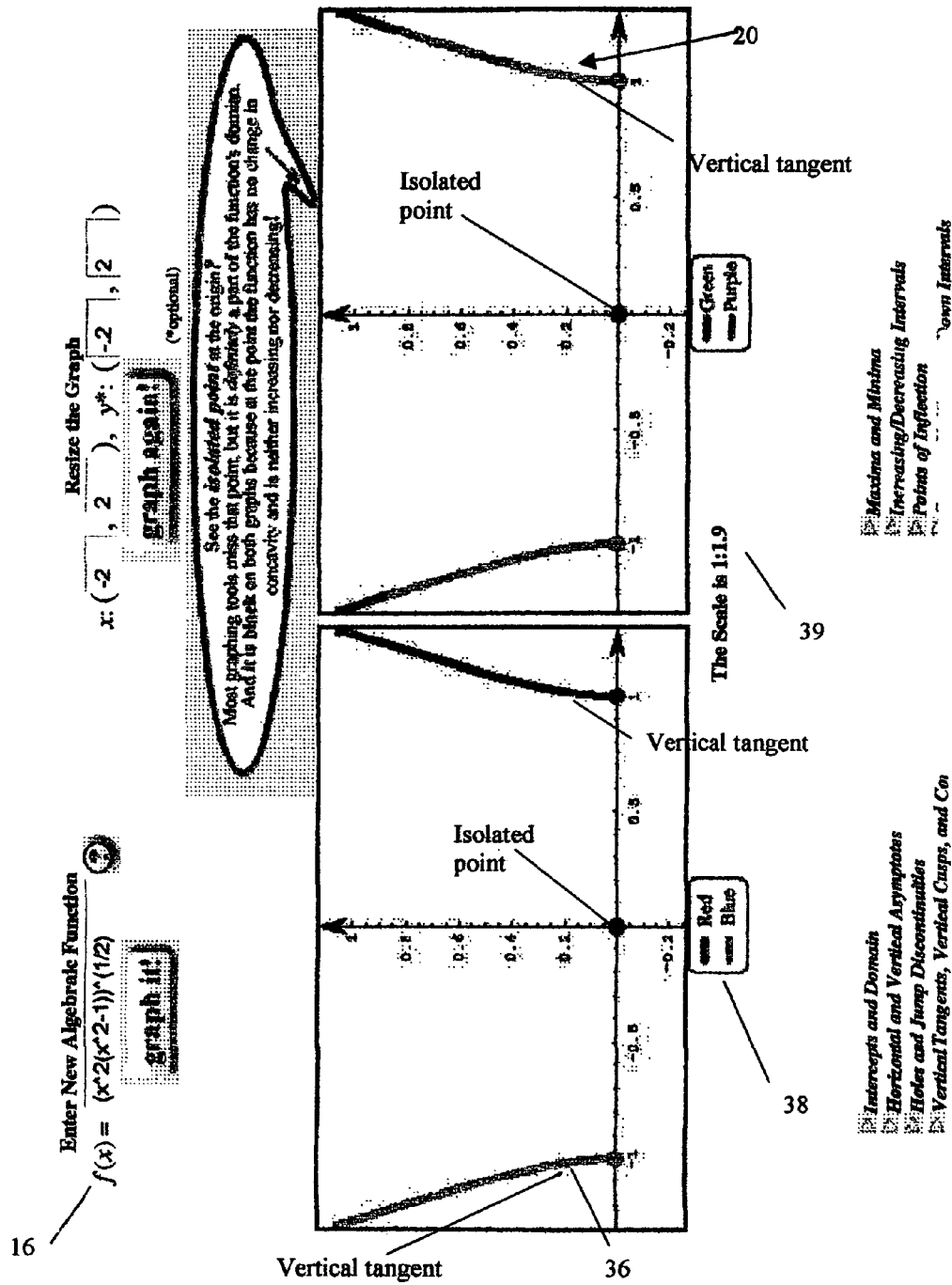
FIG. 14 is a screen view of a complete graph of an algebraic function having an isolated point and vertical tangents presented according to the system and method of the present invention.

Referring now primarily to FIG. 2, user entry subsystem 23 can include, but is not limited to, type receiver 61, function receiver 63, and custom receiver 62. Function receiver 63 can process any type 18 of function 16. Three types 18 of functions 16—polynomial, rational (FIG. 11), algebraic (FIGS. 12-15)—are described herein, but the invention is not limited to these types 18. Function receiver 63 can process polynomial functions, which are expressions that involve only the algebraic operations of addition, subtraction, multiplication, and raising to a non-negative integer power. Function receiver 63 can also process rational functions. Rational functions can be distinguished from polynomial functions by the appearance of asymptotes (vertical, horizontal, and slant) and holes (FIG. 11). Function receiver 63 can also process algebraic functions, which are expressions that involve only the algebraic operations of addition, subtraction, multiplication, division, raising to an integer power, and extracting an odd number root or an even number root. Taking roots—the operation that distinguishes general algebraic functions from either polynomials or rational functions—can affect function processing in at least two ways: (1) taking even roots may reduce the size of a function's domain 32 considerably, possibly limiting the display region, while (2) taking odd roots may create distinctive visual characteristics that are not possible with either polynomial or rational functions. General algebraic functions can be distinguished from either polynomials or rational functions by the appearance of vertical tangents (FIG. 12), vertical cusps (FIG. 15), corners, jump discontinuities (FIG. 13), and isolated points (FIG. 14). Custom receiver 62 can receive and process changes in various parameters upon which system 10 depends. For example, a new type 18 can be defined through custom receiver 62 and customizer 25. User entry subsystem 23 can notify, for example, type receiver 61, error checking subsystem 33, and function receiver 63 that a new type 18 has been defined. Type receiver 61 can receive a type 18 designation from user 13 and process function 16 according to the received type 18.

Figure 3:
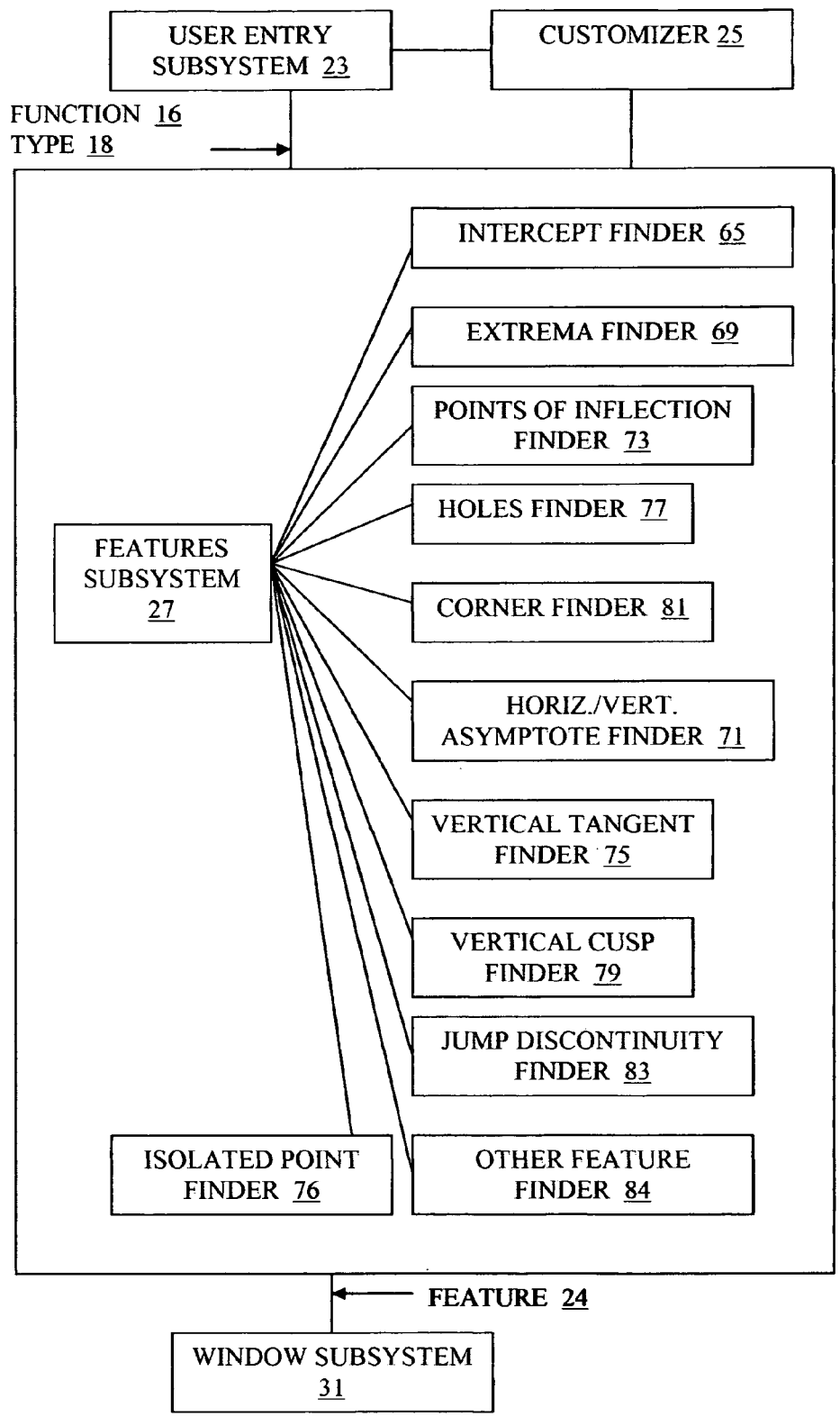
FIG. 3 is a schematic block diagram of the components of the features subsystem.

Referring now primarily to FIG. 3, features subsystem 27 can include, but is not limited to, intercept finder 65, extrema finder 69, points of inflection finder 73, holes finder 77, corner finder 81, horizontal/vertical asymptote finder 71, vertical tangent finder 75, vertical cusp finder 79, jump discontinuity finder 83, and isolated points finder 76. Values like the square root of 2 are commonly referred to as symbolic or exact values, while the corresponding approximate value, 1.414, is referred to as a numerical value. Certain symbolic form values can be useful to see, such as the symbolic form values that a user would typically get when solving an equation by hand. Features subsystem 27 can automatically display these symbolic forms in all tables created by features subsystem 27 and in interval notation answers. More specifically, each of the modules of features subsystem 27 listed above is described below.

To find all x-intercepts, intercept finder 65 can solve the equation $f(x)=0$ both symbolically (exactly), when possible (for polynomials, mathematical theory only guarantees symbolic solutions for polynomials of degrees 4 or less), and numerically. Any values that are also denominator zeros (they cannot be intercepts) are excluded. To find all y-intercepts, when $x=0$ is not a denominator zero, intercept finder 65 computes $x=0$ and $y=f(0)$.

To find all extrema, extrema finder 69 can solve the equation $f'(x)=0$ both symbolically (exactly), when possible, and numerically. Numbers in the set $\{x_m\}$ of numbers that satisfy this equation (the zeros of $f'$) are possible x-coordinates of local maxima and local minima, so the points in the set $\{(x_m, f(x_m))\}$ become the extrema. A table of values can be constructed to help determine local maxima and minima. The table can consist of the solutions, $x_m$, from above, together with conveniently selected "test values" (integer values, whenever possible) between and beyond these numbers, which indicate whether the function is increasing (the first derivative is positive) or decreasing (the first derivative is negative) between values of $x_m$. The table can have up to, for example, 6 columns, including values for x (symbolic (exact), if available and not too lengthy, as well as numerical), $f(x)$ (symbolic (exact), if available and not too lengthy, as well as numerical), $f'(x)$ (numerical), and the sign of $f'(x)$ or an indication, when $f'(x)=0$ and has no sign or is undefined, of whether it is a local maximum or minimum or not. Using the information given in the table of local maxima and minima described above, the at least one curve segment 36 where the function is increasing and decreasing can be determined, displayed, and highlighted.

To find all holes (FIG. 13) and horizontal/vertical asymptotes, holes finder 77 and horizontal/vertical asymptote finder 71 determine all denominator zeros by setting the denominator, den(x), equal to zero and solving the equation den(x)=0. If a denominator zero, say x=a, can be eliminated due to improper cancellation, it is the x-coordinate of a hole (FIG. 13); otherwise, x=a is the equation of a vertical asymptote. Horizontal/vertical asymptote finder 71 further investigates vertical asymptotes from each side to determine if the limiting behavior is $+\infty$ or $-\infty$, and this information can be reported to graph creator 93, which can prepare for example, a table containing the information. To find any horizontal asymptotes in a rational function, horizontal/vertical asymptote finder 71 can compute $$\lim_{x \to \infty}$$

$f(x)$. If this value is numeric, referred to as b, then y=b is the equation of a horizontal asymptote; otherwise, there is no horizontal asymptote. To find any horizontal asymptotes of a non-rational function, horizontal/vertical asymptote finder 71 can compute two limits:

$$\lim_{x \to \infty}$$

$f(x)=b_1$ and $$\lim_{x \to -\infty}$$

$f(x)=b_2$. Whenever either (or both) of $b_1$ and $b_2$ is finite, then either (or both) of $b_1$ and $b_2$ corresponds to a horizontal asymptote (in case both are finite and $b_1 \neq b_2$, there are two horizontal asymptotes: $y=b_1$ and $y=b_2$); otherwise, there is no horizontal asymptote.

To find all points of inflection (these denote changes in concavity), points of inflection finder 73 can solve the equation $f''(x)=0$ both symbolically (exactly), when possible, and numerically. Numbers in the set $\{x_{poi}\}$ of numbers that satisfy this equation (the zeros of $f''$) are possible x-coordinates of points of inflection, so all points in the set $\{(x_{poi}, f(x_{poi}))\}$ are possible points of inflection. A table of values can be constructed to help determine concavity and points of inflection (FIG. 20). The table can consist of the solutions, $x_{poi}$, from above, together with conveniently selected "test values" (integer values, whenever possible) between and beyond these numbers, which indicate whether the function is concave up (the second derivative is positive) or concave down (the second derivative is negative) between values of $x_{poi}$. The table can have up to 6 columns, including, for example, values for x (exact (symbolic), if available and not too lengthy, and numerical), $f(x)$ (exact (symbolic), if available and not too lengthy, and numerical), $f''(x)$ (numerical), and the sign of $f''(x)$ or an indication, when $f''(x)=0$ and has no sign or is undefined, of whether it is a point of inflection or not. Using the information given in the table of points of inflection described above, at least one curve segment 36 where the function is concave up and concave down can be determined, displayed, and highlighted.

Jump discontinuity finder 83 analyzes holes (FIG. 13) with regard to the left and right hand limits; if the limits are unequal but real-valued, that location is designated as a jump discontinuity (FIG. 13).

To find vertical tangents (FIG. 12), vertical cusps (FIG. 15), and corners (FIG. 13), Vertical tangent finder 75, vertical cusp finder 79, and corner finder 81 can rewrite any function involving the absolute value function (such a function is an algebraic function) using the alternative form, $abs(x)=\sqrt{x^2}$ and can compute the first derivative. Vertical tangent finder 75, vertical cusp finder 79, and corner finder 81 can set the denominator of the first derivative equal to zero and solve for x to determine where there is no slope (where the first derivative is not finite). If the derivative is not defined at x=a, and if both $$\lim_{x \to a^+}$$

$f'(x)$ and $$\lim_{x \to a^-}$$

Figure 15:
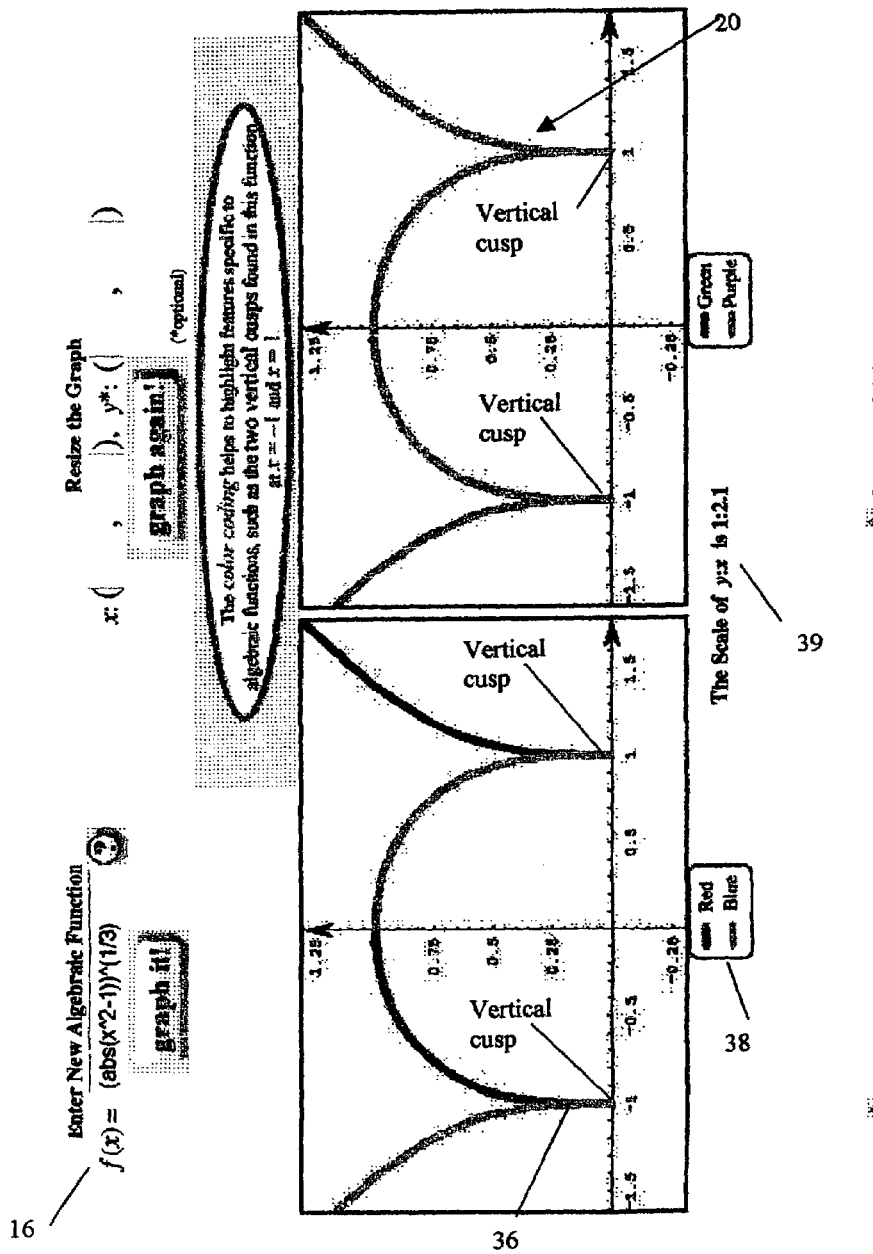
FIG. 15 is a screen view of a complete graph of an algebraic function having vertical cusps presented according to the system and method of the present invention.

$f'(x)$ are either $+\infty$ or are $-\infty$, the graph has a vertical tangent (FIG. 12) at x=a. If both values are infinite but with different signs (one is $+\infty$ and the other is $-\infty$), x=a is a vertical cusp (FIG. 15). If x=a is a domain end point and the limit from the defined side is either $+\infty$ or $-\infty$, then the graph has a vertical tangent (FIG. 12) at x=a.

To find isolated points (FIG. 14), isolated point finder 76 can analyze function 16 before any intervening simplifications are done that might cause information to be lost. During the analysis, isolated point finder 76 can find up to all values for which an even root radicand might be zero and isolated. Isolated point finder 76 can plot isolated points as, for example, solid small circles, designating in the standard way that function 16 is defined at a point of singularity.

To find at least one mathematical feature 24 that is defined by, for example, user 13 interfacing with customizer 25, other feature finder 84 performs a process that can be defined by user 13, or through any other means, through customizer 25.

Figure 4:
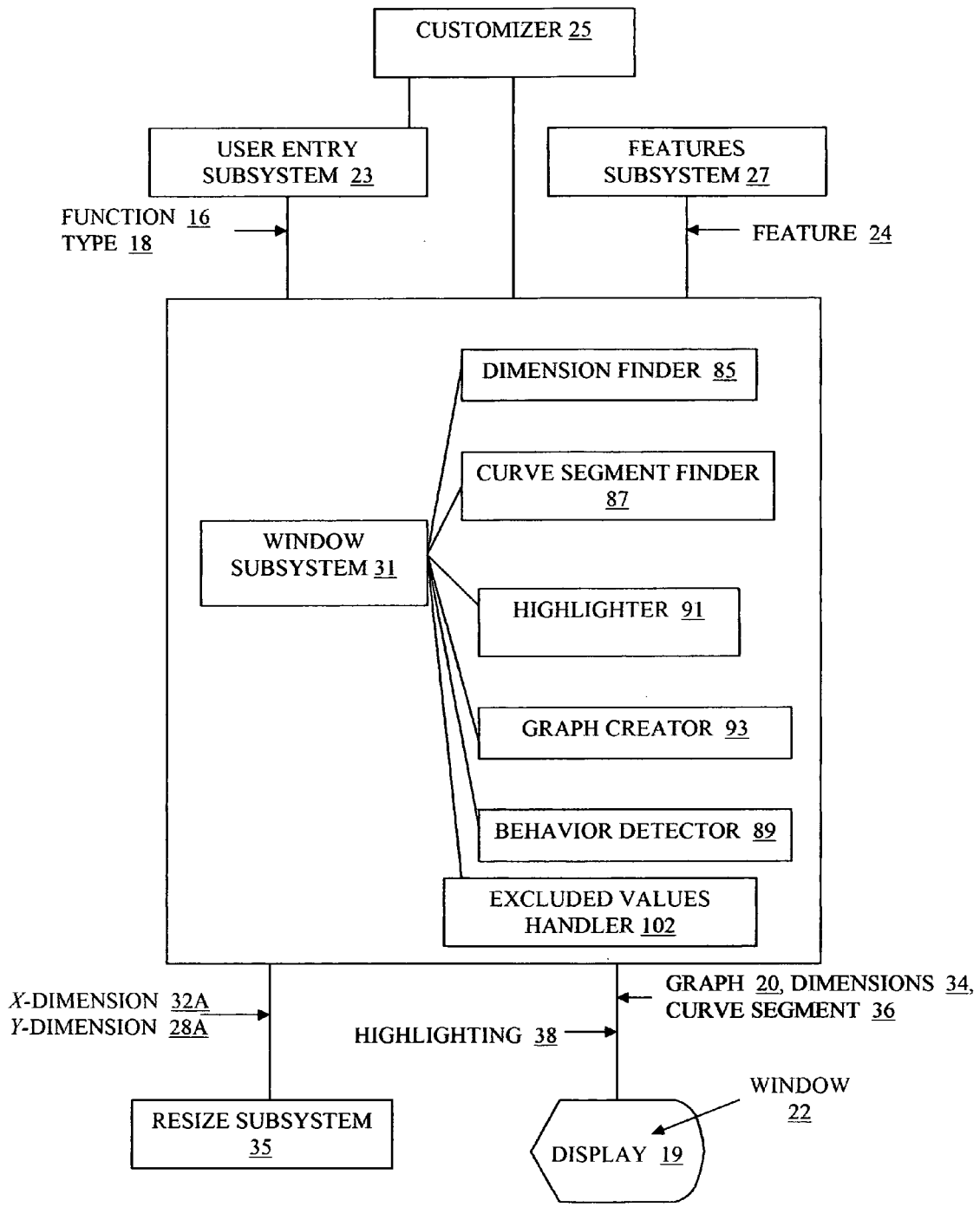
FIG. 4 is a schematic block diagram of the components of the window subsystem.

Referring now primarily to FIG. 4, window subsystem 31 can include, but is not limited to, graph creator 93, dimension finder 85, curve segment finder 87, highlighter 91, behavior detector 89, and excluded values handler 102. For a polynomial function, graph creator 93 can display highlighted graph 20, which can include all the important at least one mathematical features 24 (FIG. 1) contained within the optimal plotting interval, including y-dimension 28A values (FIG. 1) that are optimized to show the locally extreme y-values restricted to the given plotting interval. Here, dimension finder 85 selects the y-dimension 28A values to expand the curve vertically to accentuate visually any peaks or valleys. When the location where the axes cross on a graph is not the origin, to make users aware of this fact, graph creator 93 can display a note under graph 20. Graph creator 93 can compute and display the ratio of the spread of y-dimension 28A values (upper minus lower) to the spread of x dimension 32A values (upper minus lower) or the reverse, whichever is larger, which are briefly referred to here as the scale 39 (see FIGS. 11-15). Graph creator 93 can display the x- and y-intercepts, previously determined, in tabular form, with values given in symbolic (exact) form, if available and not too lengthy, as well as numerical form. Graph creator 93 can display vertical tangents (FIG. 12), vertical cusps (FIG. 15), and corners in tabular form and provide explanations for them.

Continuing to further refer primarily to FIG. 4, graph creator 93 can create graph 20 of a rational function 16 that can include, for example, up to all of its interesting mathematical features: x- and y-intercepts, local maxima and local minima, points of inflection, holes (FIG. 13), vertical asymptotes, well as the horizontal, or slant, or higher degree polynomial asymptote (quadratic, cubic, etc.) as the case may be. If there is a horizontal asymptote, for example, y=b, the numerical value b can be added to the set $S_y$ of important y-values to be displayed; otherwise, features subsystem 27 can determine the locations of as many as all the important at least one mathematical features 24 of the requisite polynomial asymptote (as done when plotting a polynomial function) and all these locations are added to $S_x$ (important x-values to be displayed) and $S_y$, respectively, revising if necessary the maximum and minimum x-values from the "initial" plotting interval. Features subsystem 27 can determine the maximum and minimum of the y-values in $S_y$ and can fit them into a viewing window 22 above and below the maximum and minimum x- and y-coordinates by some small percentage, such as for example 10%, of the smallest window 22 that includes all these points. If there is no x-value, i.e. when $S_x$ is empty, the default minimum can be, for example, −1 and the default maximum can be, for example, +1. If there is only one x-value, features subsystem 27 can add a value, for example 1, to the only x-value to determine the maximum x-dimension, and can subtract a value, for example 1, from the x-value for the minimum x-dimension. Features subsystem 27 can determine y-value minima and maxima in the same way for the special cases where there is up to one y-value. The resulting viewing window 22 is optimum in the sense that it can include as many as all the important at least one mathematical features 24, such as, for example, vertical asymptotic trends, of a rational function and can highlight as many as all singularities.

Continuing further to refer primarily to FIG. 4, graph creator 93 can create graph 20 of an algebraic function 16 that can include, for example, as many as all of its interesting at least one mathematical features 24: x- and y-intercepts, local maxima and local minima, points of inflection, holes (FIG. 13), vertical and horizontal asymptotes, vertical tangents (FIG. 12), vertical cusps (FIG. 15), corners, jump discontinuities (FIG. 13), and isolated points (FIG. 14). Highlighter 91 can show the singularities using highlighting 38 such as, for example, dashed lines in grey and either solid or empty circles in an appropriate color (matching that of the curve at that location). In addition, if domain 32 has finite interval endpoints, highlighter 91 can show the end points of the curve, either as, for example, solid small circles when they are included or empty small circles when they are excluded. To graph functions with odd root powers, when the argument is negative, graph creator 93 can compute the real-valued root of the odd root power instead of the imaginary value that is its principal value. To do this, the sign of x can be multiplied by the root of the absolute value of x. This algorithm can provide a real-valued root for both positive and negative values of x. Further, graph creator 93 can display and provide the values for any horizontal and vertical asymptotes.

Continuing still further to refer primarily to FIG. 4, to further describe the determination of an optimum viewing window 22 for a rational function, $f$, as previously outlined, dimension finder 85 can determine the set of x-coordinates, $S_x$, and the set of y-coordinates, $S_y$, for the following at least one mathematical feature 24: intercepts, extrema, points of inflection, and holes (FIG. 13). To further describe the determination of an optimum viewing window 22 for an algebraic, dimension finder 85 can determine the set of x-coordinates, $S_x$, and the set of y-coordinates, $S_y$ for the following at least one mathematical feature 24: intercepts, extrema, points of inflection, isolated points, vertical and horizontal asymptotes, jump discontinuities, discontinuities, vertical tangents, vertical cusps, and corners. In addition, if there are any horizontal asymptotes, dimension finder 85 can determine the respective coordinate locations where the slope becomes small regardless of sign (for example, solutions to $$f'(x) = \pm \frac{1}{50}$$

can further use the coordinates). Dimension finder 85 can further use the minimum and maximum x-coordinates in $S_x$ for the "initial" plotting interval of x-values (subject to revision, as indicated below). If there are any vertical asymptotes, the respective coordinate locations where the slope is large regardless of sign can be used (for example, solutions of $f'(x)=\pm 81$ can be used to obtain the coordinates), as long as the corresponding x-values are within the "initial" plotting interval of x-values. Curve segment finder 87 can determine numbers in the set $\{x_m\}$ of numbers, in addition to the denominator zeros, that satisfy the differential equation $f'(x)=0$. Those numbers can split the plotting interval into at least one curve segment 36, if possible, where the graph is either increasing (when $f'(x)>0$) or decreasing (when $f'(x)<0$), unless the function is constant. Alternatively, using the information given in the table of local maxima and minima discussed above, curve segment finder 87 can determine at least one curve segment 36, if possible, where a rational function is increasing and decreasing. Curve segment finder 87 can determine at least one curve segment 36, if possible, and graph creator 93 can plot function 16 on at least one curve segment 36. Highlighter 91 can highlight graph 20 in, for example, the color red on at least one curve segment 36 where function 16 is increasing, the color blue on at least one curve segment 36 where the function is decreasing, or the color black for a constant function (indicating that function 16 is neither increasing nor decreasing on any at least one curve segment 36). The one or more plots so obtained can be combined into a single graph 20 over the optimum viewing window 22 that displays function 16 with highlighting 38 (including, for example, the color black if function 16 is constant). Curve segment finder 87 can determine (and graph creator 93/highlighter 91 can plot) (1) holes (FIG. 13) (including, in the case of algebraic functions, jump discontinuities (FIG. 13)), which for algebraic functions can only have holes; i.e., unlike the greatest integer function they must be undefined at a jump point) that can be shown, for example, as empty small circles in highlighting 38, for example, the same color (red, blue, or black) as graph 20 at the location of the hole (FIG. 13); (2) any vertical or horizontal asymptotes that can be shown in highlighting 38 such as, for example, dashed lines in the color gray; (3) the slant or higher degree polynomial asymptote for rational functions that can be shown in highlighting 38 such as, for example, a dashed line in the color gray; (4) any isolated points (FIG. 14) as solid black small circles, and (5) end points belonging to a curve that can be highlighted as, for example, small circles in the color of the curve nearby.

Continuing yet still further to refer primarily to FIG. 4, curve segment finder 87 can determine numbers in the set $\{x_{poi}\}$ of numbers, in addition to the denominator zeros, that satisfy the differential equation $f''(x)=0$ (or using the information given in the table of points of inflection discussed above), and that can split the plotting interval into at least one curve segment 36, if possible, where the graph is either concave up (when $f''(x)>0$) or concave down (when $f''(x)<0$), unless function 16 is linear or constant. Graph creator 93 can plot function 16 on each such at least one curve segment 36, if possible, and highlighter 91 can highlight in, for example, the color purple, at least one curve segment 36 where function 16 is concave up, the color green on at least one curve segment 36 where function 16 is concave down, or the color black for a linear or constant function 16 (indicating that function 16 is neither concave up nor concave down on any at least one curve segment 36). The one or more plots so obtained can be combined into a single graph 20 over the optimum viewing window 22 that can display function 16 with highlighting 38 such as, for example, the colors purple and green (or, in the case of a linear or constant function 16, in, for example, the color black). Also, highlighter 91 can show (1) any holes (FIG. 13), for example, as empty small circles in the same highlighting 38, for example purple, green, or black, as graph 20 at the location of the hole; (2) any vertical (or horizontal, in the case of algebraic functions) asymptotes as, for example, dashed lines highlighted in the color gray; (3) the horizontal or slant or higher degree polynomial asymptote as, for example a dashed line highlighted in the color gray; and (4) any isolated points (FIG. 14) and end points belonging to a curve as solid black small circles. To avoid having solid vertical lines that are not part of the graph (they otherwise appear in plots that have vertical asymptotes and/or jump discontinuities (FIG. 13)), functions are plotted on at least one curve segment 36 where these values are endpoints, and the plots can then be combined at the end with dashed vertical lines for vertical asymptotes (FIG. 11) and other auxiliary graphics for jump discontinuities (FIG. 13). For general algebraic functions, when the zeros of $f'$ cannot be determined, highlighter 91 can replace an increasing/decreasing color-coded graph or multi-level grey-scale graph by a single color graph, for example, in black. Also, when the zeros of $f''$ cannot be determined for general algebraic functions, highlighter 91 can replace a concave up/concave down color-coded graph or multi-level grey-scale graph by a single color graph, for example, in black. Further, highlighter 91 can deliver a note to indicate the reason why the single color graph is presented.

Continuing further to refer primarily to FIG. 4, for polynomials, behavior detector 89 can determine end behaviors, according to theory, based on the leading term, $a_n x^n$. Behavior detector 89 can also determine the sign of $a_n$ and whether or not n is even or odd. In particular, (1) if $a_n>0$ and n is even, the behavior is up on the left and up on the right; (2) if $a_n<0$ and n is even, the behavior is down on the left and down on the right; (3) if $a_n>0$ and n is odd, the behavior is down on the left and up on the right; (4) if $a_n<0$ and n is odd, the behavior is up on the left and down on the right. The plotting region reported can consist of the dimensions 34 of the viewing window 22: minimum and maximum x-coordinates plotted, and minimum and maximum y-coordinates plotted. Behavior detector 89 can display this information to clarify and confirm what the user can read from the graph. For rational functions, behavior detector 89 can determine end behaviors based on computing the polynomial quotient, applying the above rules for polynomials, and displaying the results. For polynomial and rational functions, behavior detector 89 can compute $f(-x)$ and perform the following symmetry tests: (1) determine if $f(x)=f(-x)$, in which case the function is even and the graph is symmetric with respect to the y-axis, or (2) determine if $f(-x)=-f(x)$, in which case the function is odd and the graph is symmetric with respect to the origin. Behavior detector 89 can report these results in tabular form.

With still further reference primarily to FIG. 4, excluded values handler 102 can display the excluded x- and y-intercepts, previously determined, for example, in tabular form, and can display denominator zeros (the x-coordinates) that give rise to holes (FIG. 13). Excluded values handler 102 can also investigate vertical asymptotes from each side to determine if the limiting behavior is $+\infty$ or $-\infty$, and can report this information in a table. For algebraic functions, excluded values handler 102 can determine the excluded end points of at least one curve segment 36 of increase and decrease from denominator zeros. Otherwise, the endpoints can be included, which is in accord with the definitions of increasing and decreasing. Denominator zeros can be taken into account to determine the excluded end points of concave up and concave down at least one curve segment 36. Otherwise, the endpoints can be included, which is in accord with the basic definitions of concavity segments (all points for which the chords connecting any two points all lie on one side of the curve). Excluded values handler 102 can determine if the value, $x_{poi}$, is a hole (FIG. 13) and needs, for this reason, to be excluded as a point of inflection, or if the value, $x_m$, is a hole (FIG. 13) and needs, for this reason, to be excluded as a local extrema.

Figure 5:
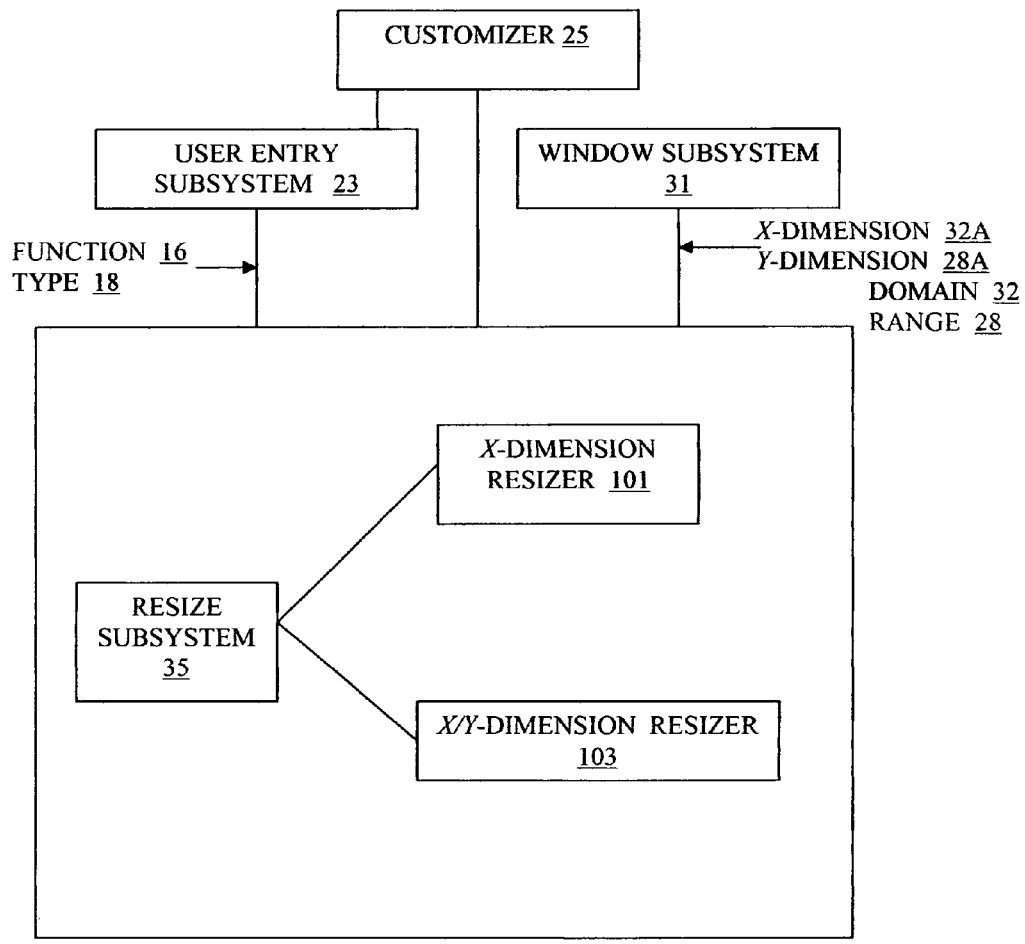
FIG. 5 is a schematic block diagram of the components of the resize subsystem.

Referring now primarily to FIG. 5, resize subsystem 35 can include, but is not limited to, x-dimension resizer 101 and x/y-dimension resizer 103. Resize subsystem 35 can access x-dimension 32A values of type 18, which are, for example, user-supplied. Optionally, user 13 can also supply y-dimension 28A values of resize subsystem 35. x-dimension resizer 101, which can help user 13 (FIG. 1) (through user entry subsystem 23) to resize the viewing window 22, can allow the entry of x-dimension 32A values (FIG. 1) alone (the lower and upper limits on x-coordinates, comprising the plotting interval). x-dimension resizer 101 can determine optimum y-dimensions 28A values (the lower and upper limits on y-coordinates) so that the viewing window 22 can include, for example, as many as all the important at least one mathematical features 24 of the function (intercepts, extrema, points of inflection, holes (FIG. 13), isolated points (FIG. 14), vertical asymptotes, as well as the horizontal or slant or higher degree polynomial asymptote, etc.) restricted to the infinite vertical strip determined by the user-specified plotting interval. Alternatively, x/y-dimension resizer 103 can allow the entry of both x-dimension 32A and y-dimension 28A values for full user control of the actual viewing window 22 dimensions 34. The result is a user-specified viewing window 22, containing highlighted graphs 20 to the extent that they lie inside this viewing window 22. Resizing in the vicinity of the juncture when the graph is flat, entering only x-dimension 32A values and permitting automatic determination of optimum y-dimensions 28A values can enable the user to visually verify the existence of the peak or valley or change in concavity. Resize subsystem 35 can be indirectly invoked by other actions taken by the user, for example, but not limited to, a mouse click-and-hold on at least one curve segment 36 can allow the user to "slide" along the curve in order to dynamically view further aspects of function 16.

Figure 6:
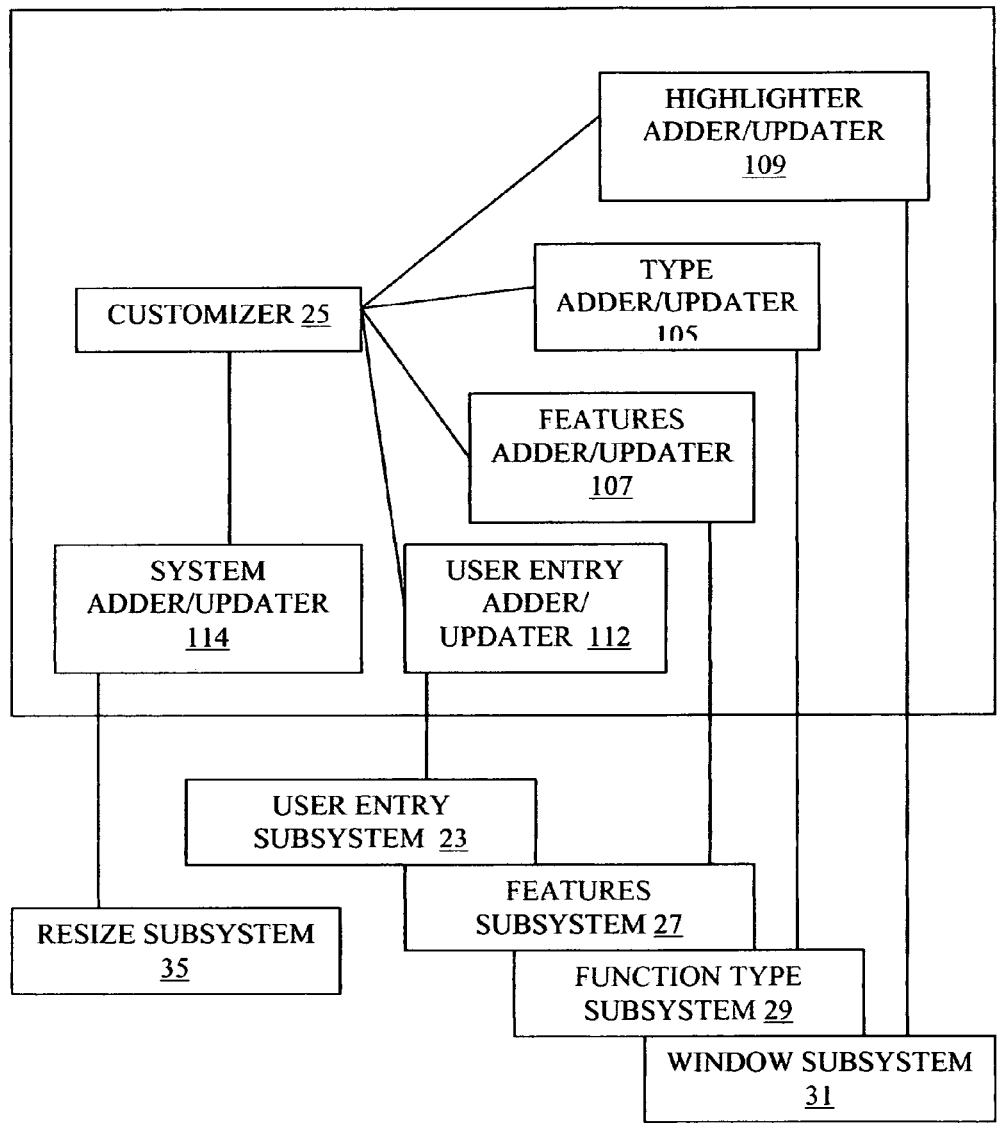
FIG. 6 is a schematic block diagram of the components of the customizer.

Referring now primarily to FIG. 6, customizer 25 can include, but is not limited to, highlighter adder/updater 109, type adder/updater 105, features adder/updater 107, user entry adder/updater 112, and system adder/updater 114. Customizer 25 allows modifications to system 10. Type adapter/updater 105 can allow a user 13 or administrator 17 to add types 18 to system 10 and to update existing types 18. Highlighter adder/updater 109 can allow a user 13 or administrator 17 to update highlighting 38 preferences. Features adder/updater 107 can allow a user 13 or administrator 17 to add or update at least one mathematical feature 24 to system 10.

User entry adder/updater 112 can allow user 13 or administrator 17 to add/update, for example, user entry prompts and other display options that, for example, window subsystem 31 present to user 13. System adder/updater 114 can allow user 13 or administrator 17, with appropriate authentications, to add/update internal parameters of system 10, for example, default values for resize subsystem 35.

Figure 7:
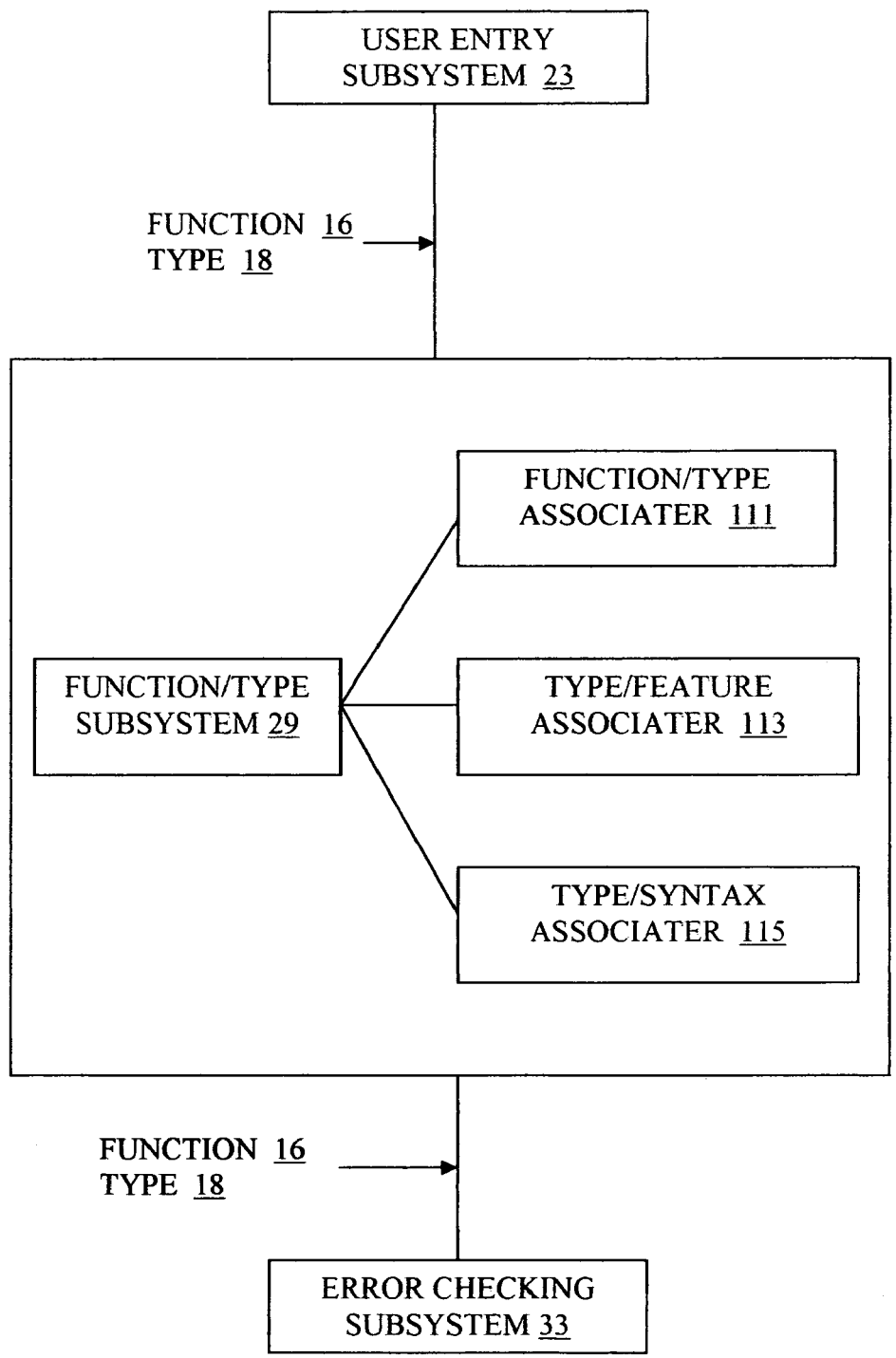
FIG. 7 is a schematic block diagram of the components of the function type subsystem.

Referring now primarily to FIG. 7, function/type subsystem 29 can include, but is not limited to, function/type associater 111, type/feature associater 113, and type/syntax associater 115. Function/type subsystem 29 can associate a type 18 with a function 16, where the type 18 determines which at least one mathematical feature 24 is associated with the function 16. Function/type associater 111 can allow a user 13 or administrator 17 to associate a certain function 16 with a type 18. Type/feature associater 113 can allow a user 13 or administrator 17 to associate at least one mathematical feature 24 with a type 18. Type/syntax associater 115 can allow a user 13 or administrator 17 to associate certain allowable syntax with type 18.

Figure 8:
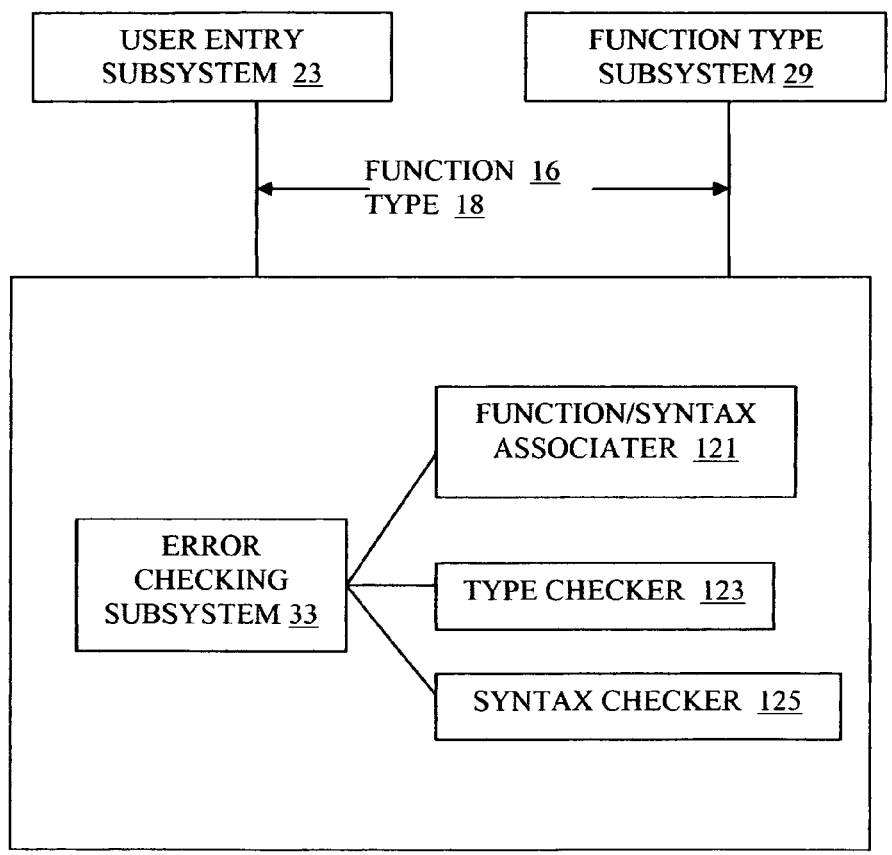
FIG. 8 is a schematic block diagram of the components of the error checking subsystem.

Referring now primarily to FIG. 8, error checking subsystem 33 can include, but is not limited to, function/syntax associater 121, type checker 123, and syntax checker 125. Function/syntax associater 121 can determine the type of syntax that is to be allowed for function 16 according to type 18. Syntax checker 125 can check the user input for syntax errors, such as, for example, mismatched parentheses and symbols that are not permitted such as, for example, "!". Syntax checker 125 can further cause an alert message to be delivered to the user indicating the nature of any syntax error. Type checker 123 can deliver an alert message when there is a mismatch between the type 18 and function 16 entered. Type 18 can be associated with a particular type of function as follows: every polynomial function is a rational function, and every rational function is an algebraic function. Thus, if a polynomial function is entered, type 18 is most specifically polynomial, not rational nor algebraic. For example, if the type 18 of function 16 is entered as algebraic but a polynomial function is entered, type checker 123 can cause an alert message to be delivered to user 13. As another example, if the type 18 is entered as algebraic, if there are no denominator zeros, if domain 32 is all real numbers, and if the expression is a polynomial, type checker 123 can cause an alert to be raised because function 16 is not, most specifically, an algebraic function: it is a polynomial. As yet another example, if type 18 is entered as algebraic, if there are denominator zeros and domain 32 is otherwise all real numbers, and either (1) after improper cancellation the result is a polynomial, or (2) the numerator is a polynomial and the denominator is either a polynomial or a number, type checker 123 can cause an alert to be raised because function 16 is not, most specifically, an algebraic function: it is a rational function. As yet a still further example, if type 18 is entered as algebraic, if any transcendental function is detected in the entry (a trigonometric, logarithmic, exponential, hyperbolic trigonometric, or an inverse trigonometric or hyperbolic trigonometric function), or if a power of x is not a rational number (instead, there is an exponent like $\pi$ or $\sqrt{2}$ or a function of x), type checker 123 can cause an alert to be raised because function 16 is not an algebraic function: it is a transcendental function.

Figure 9:
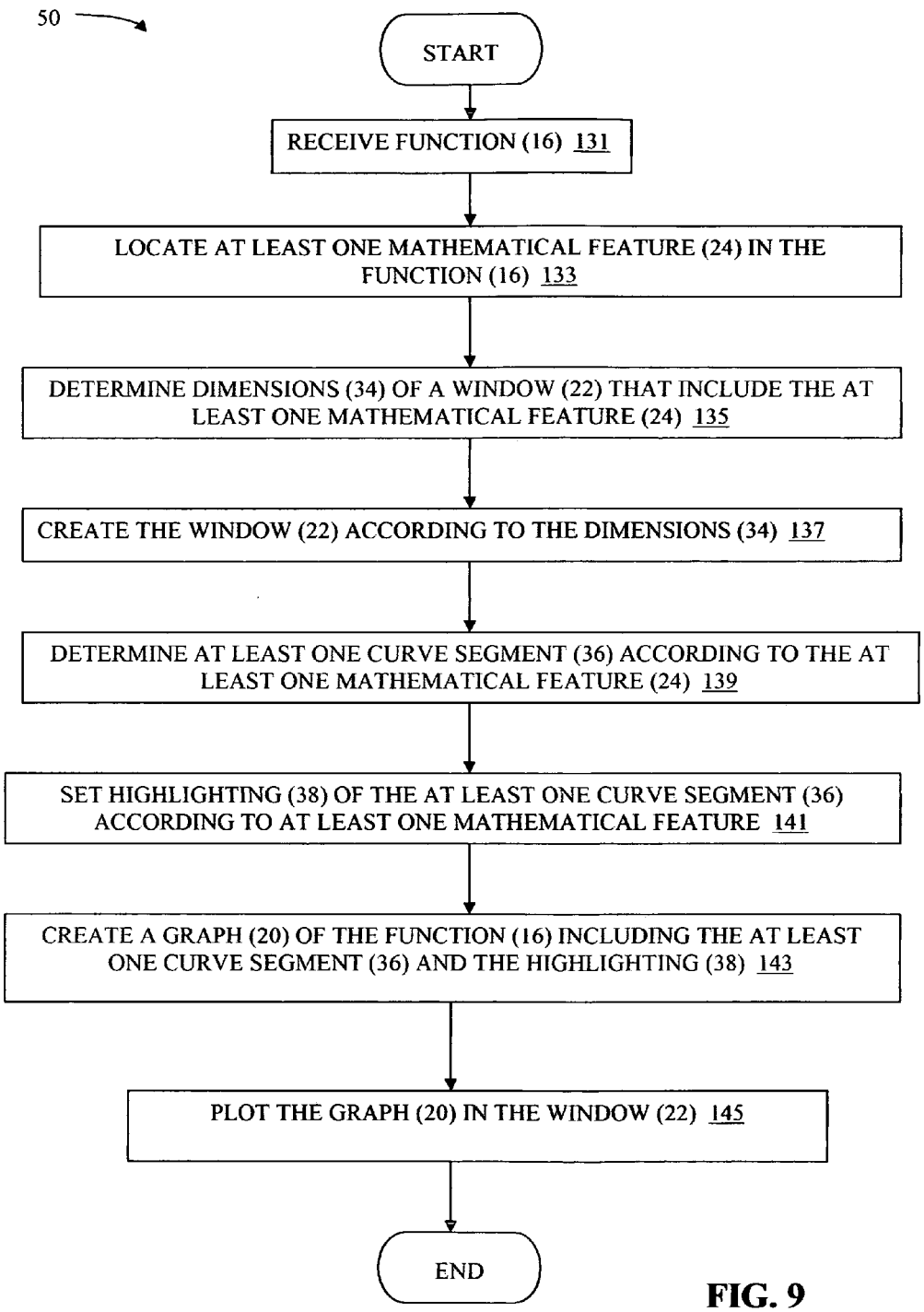
FIG. 9 is a flowchart of the method of the present invention.

Referring now primarily to FIG. 9, method 50 of the present invention can include, but is not limited to, the steps of receiving function 16 (FIG. 1) (method step 131) and locating at least one mathematical feature 24 (FIG. 1) in the function 16 (method step 133). Method 50 can also include the steps of determining dimensions 34 (FIG. 1) of a window 22 (FIG. 1) that can include at least one mathematical feature 24 (method step 135) and creating window 22 according to dimensions 34 (FIG. 1). Method 50 can further include the steps of determining at least one curve segment 36 (FIG. 1), if possible, according to at least one mathematical feature 24 (method step 139) and setting highlighting 38 (FIG. 1) of at least one curve segment 36 according to at least one pre-selected behavior (method step 141). Method 50 can still further include the steps of creating a graph 20 (FIG. 1) of function 16 including at least one curve segment 36, if possible, and highlighting 38 (method step 143), and plotting graph 20 in window 22 (method step 145).

Figure 10A:
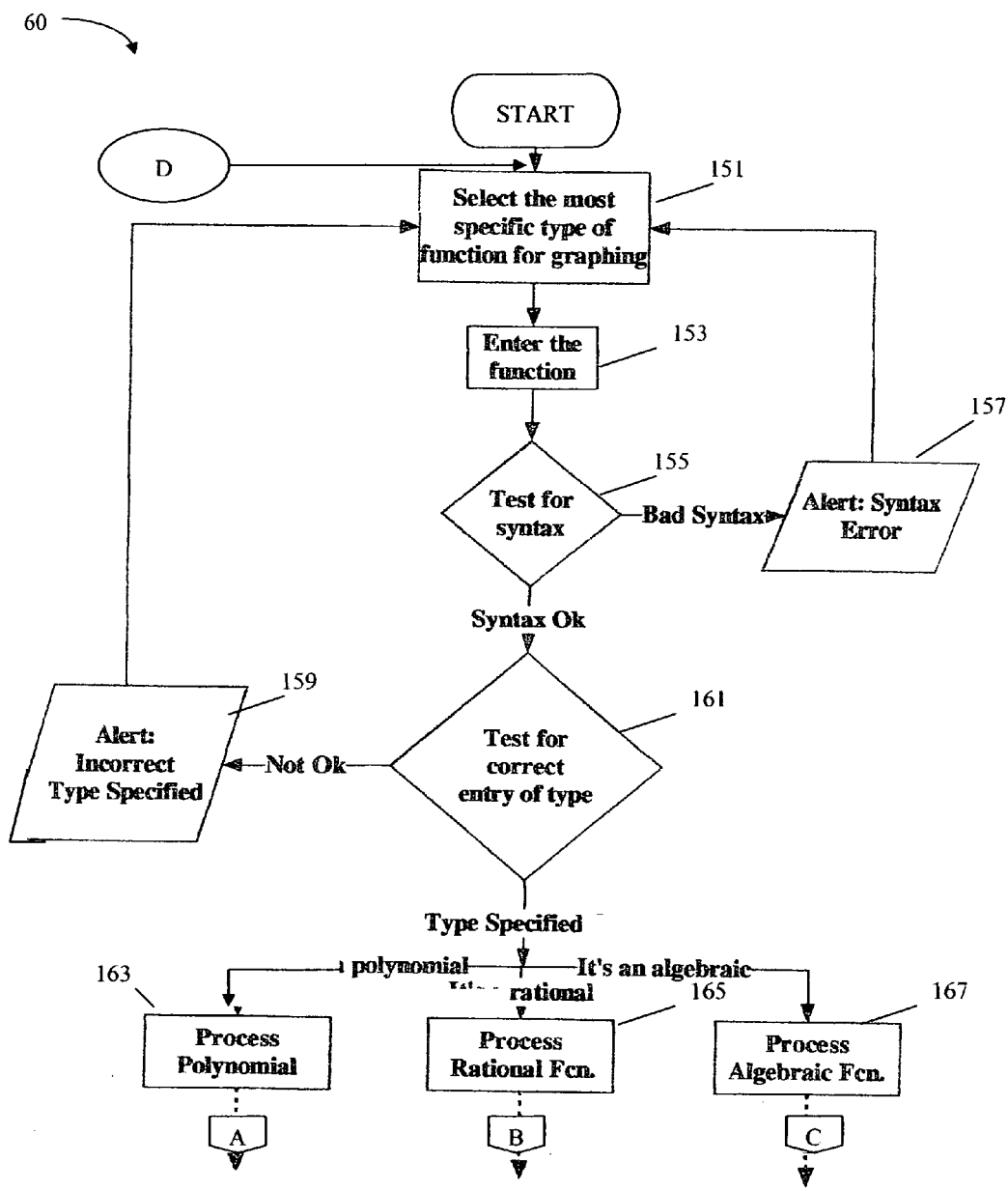
FIGS. 10A-C are flowcharts of the method of an illustrative embodiment of the present invention.
Figure 10B:
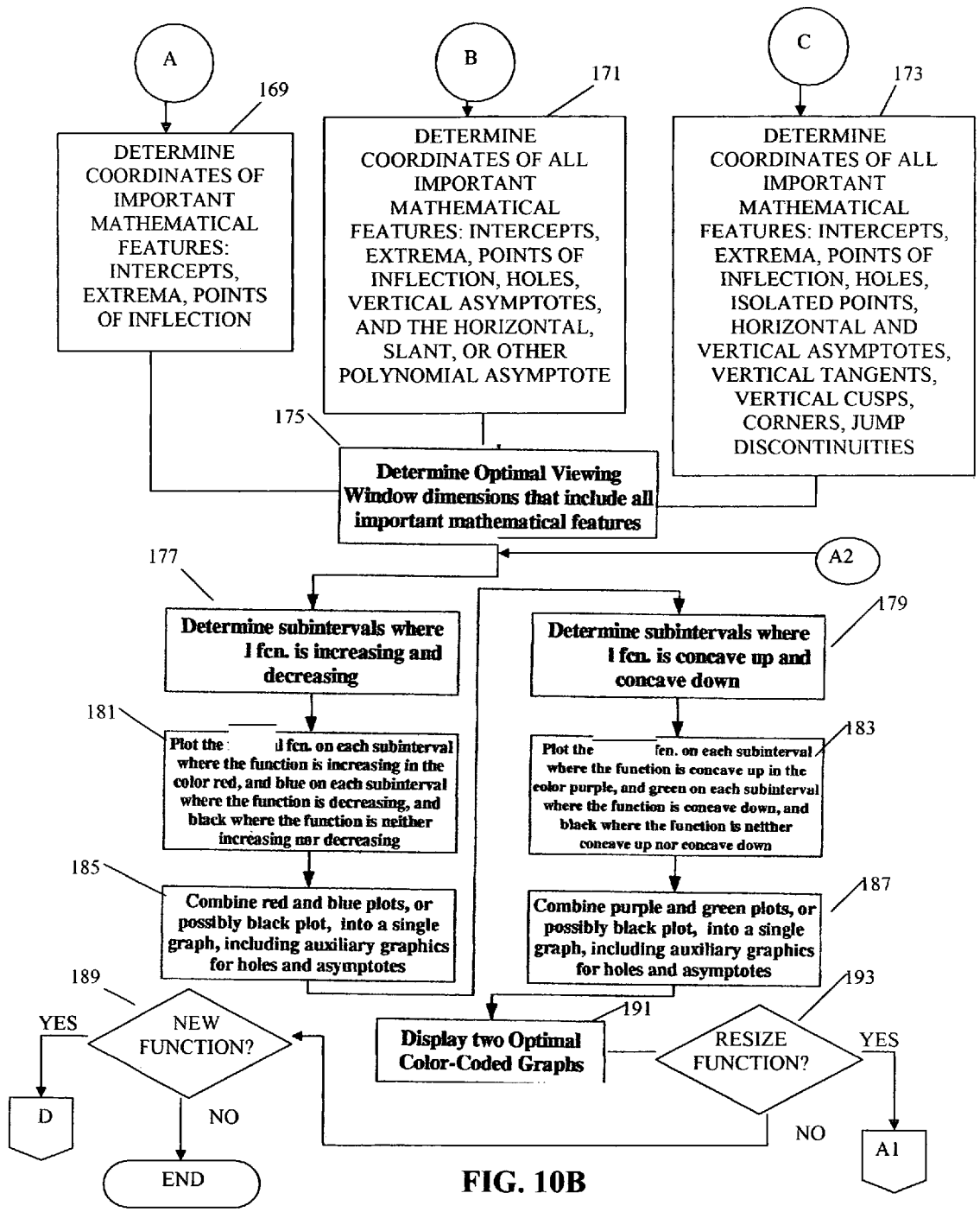
Figure 10C:
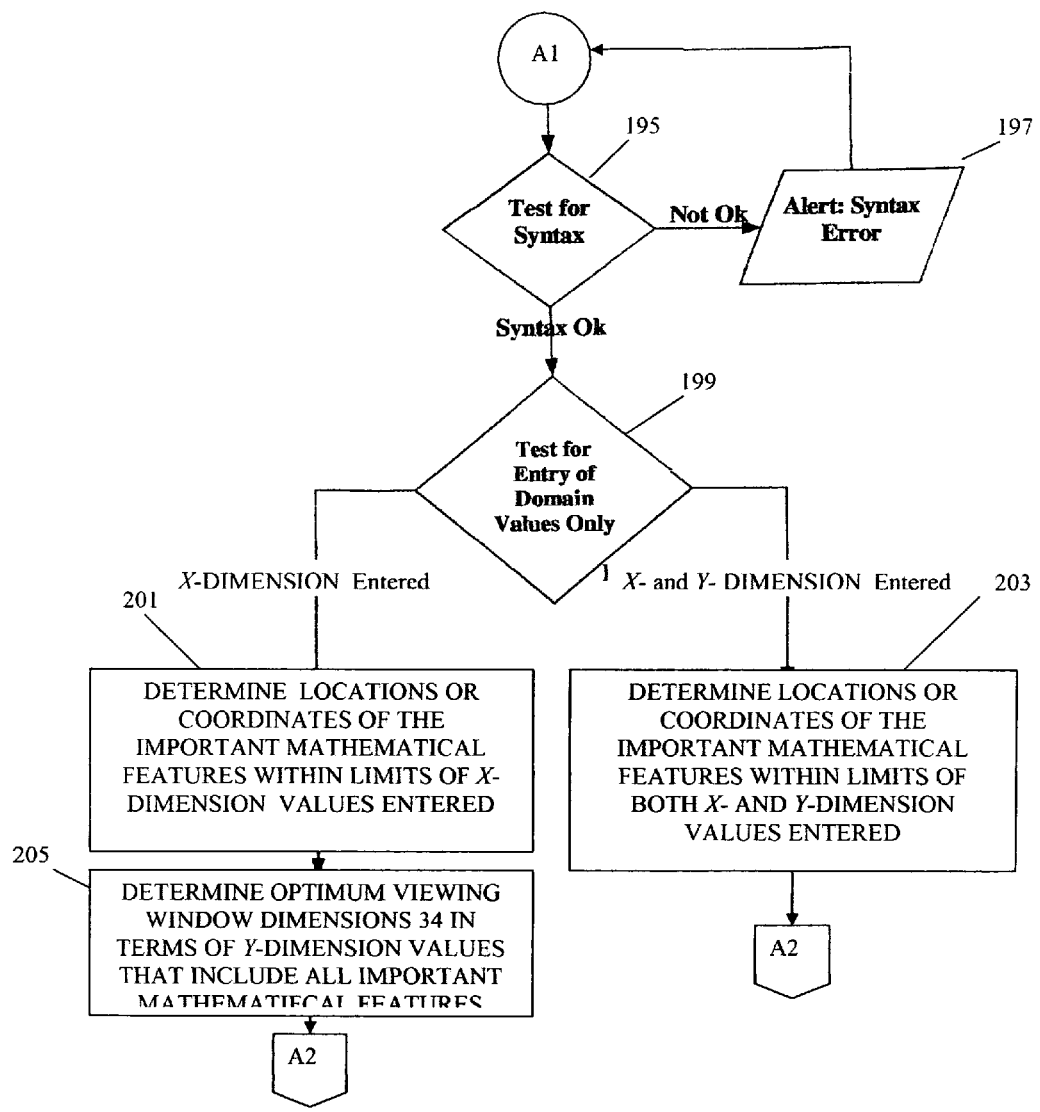

Referring now primarily to FIGS. 10A-C, and specifically referring to FIG. 10A, method 60 of the illustrative embodiment of the present invention can include, but is not limited to, the steps of selecting the most specific type 18 (FIG. 1) of function 16 (FIG. 1) for graphing such as, for example, polynomial, rational, or algebraic, presented to the user by function/type subsystem 29 (FIG. 1), and then entering such a function 16 into the user entry subsystem 23 (FIG. 1) (method step 153). Note that the invention is not limited to processing only polynomial, rational, and algebraic functions. If the syntax of function 16 is incorrect (method step 155), method 50 can include the steps of raising an alert about the error (method step 157) and returning to method step 151 to reselect the most specific type 18 of function 16 for graphing and continue processing from there. If the syntax is correct (decision step 155) but the type 18 is incorrect (decision step 161), method 50 can include the steps of raising an alert about the error (method step 159) and returning to method step 151 to reselect the most specific type 18 of function 16 for graphing and continue processing from there. If the type 18 is correct, method 50 can include the steps of initiating processing either a polynomial function (method step 163), a rational function (method step 165), or an algebraic function (method step 167).

Referring now primarily to FIG. 10B, method 50 can further include the steps of, for a polynomial function, determining coordinates of important at least one mathematical features 24 (FIG. 1) such as, but not limited to, intercepts, extrema, and points of inflection; or for a rational function, determining coordinates of all important at least one mathematical feature 24 such as, but not limited to, intercepts, extrema, points of inflection, holes (FIG. 11), vertical asymptotes, and horizontal, slant, or other polynomial asymptote; or for an algebraic function, determining coordinates of all important at least one mathematical feature 24 such as, but not limited to, intercepts, extrema, points of inflection, holes (FIG. 13), isolated points (FIG. 14), horizontal and vertical asymptotes, vertical tangents (FIG. 12), vertical cusps (FIG. 15), corners, and jump discontinuities (FIG. 13). Method 50 can further include the steps of determining optimum viewing window 22 (FIG. 1) dimensions 34 (FIG. 1) that include all important at least one mathematical features 24 (method step 175) and determining at least one curve segment 36 (FIG. 1), if possible, where function 16 (FIG. 1) is increasing and decreasing (method step 177). Method 50 can also include the step of plotting function 16 on each at least one curve segment 36, if possible, where function 16 is increasing in a color, for example, red, plotting function 16 on each at least one curve segment 36 where function 16 is decreasing in a color, for example, blue, and plotting function 16 where it is neither increasing nor decreasing in a color, for example, black (method step 181). Method 50 can still further include the step of combining the different color plots into a single graph 20 (FIG. 1), including auxiliary graphics for holes (FIG. 13) and asymptotes (method step 185). Feature analysis continues as method 50 includes the steps of determining at least one curve segment 36, if possible, where function 16 is concave up and concave down (method step 179). Method 50 can also include the step of plotting function 16 on each at least one curve segment 36, if possible, where function 16 is concave up in a color, for example, purple, plotting function 16 on each at least one curve segment 36 where function 16 is concave down in a color, for example, green, and plotting function 16 where it is neither concave up nor concave down in a color, for example, black (method step 183). Method 50 can still further include the steps of combining the different color plots into a single graph 20 (FIG. 1), including auxiliary graphics, for example for holes (FIG. 13) and asymptotes (method step 187), displaying two optimum color-coded graphs (method step 191). If the user chooses not to resize window 22 (decision step 193), and if the user chooses not to enter a new function 16 (decision step 189), method 50 includes the step of terminating execution. If the user chooses to enter a new function 16 (decision step 189) method 50 includes the step of selecting the most specific type 18 (FIG. 1) of function 16 for graphing (method step 151, FIG. 10A).

Referring now primarily to FIG. 10C, if the user chooses to resize window 22 (FIG. 1) (decision step 193), and if there are no syntax errors in the user's entries (decision step 195), and if the user only provides x-dimension 32A values (FIG. 1), method 50 can include the steps of determining coordinates of the important at least one mathematical features 24 (FIG. 1) within the limits of x-dimension 32A values entered (method step 201), and determining optimum viewing window 22 dimensions 34 (FIG. 1) in terms of y-dimension 28A values (FIG. 1) that include all important at least one mathematical features 24 (method step 205). If there are syntax errors in the user's entries (decision step 195), method 50 raises a syntax error alert (method step 197) and tests further user input (decision step 195). If both x-dimension 32A and y-dimension 28A values are entered (decision step 199), method 50 can include the step of determining coordinates of the important at least one mathematical features 24 within limits of both x-dimension 32A and y-dimension 28A values (method step 203). In either case, if both x-dimension 32A and y-dimension 28A values are entered, or only x-dimension 32A values, method 50 can include the step of determining at least one curve segment 36, if possible, where function 16 (FIG. 1) is increasing and decreasing (method step 177, FIG. 10B et seq.).

Referring now primarily to FIGS. 11-15, highlighted, for example color-coded or gray-shaded, graphs 20 help users to better visualize the properties of increasing/decreasing and concave up/concave down for function 16. In addition, peaks and valleys (extrema) can be inferred at the juncture between highlighted, for example light gray and dark gray, or red and blue, segments of an Increasing/Decreasing graph, even if the graph is flat at the juncture. Similarly, changes in concavity can be inferred at the juncture between segments of a Concave Up/Concave Down graph, highlighted, for example, with the shades of light and dark gray, or the colors purple and green, even if the graph is flat at the juncture. At least one curve segment 36 can be distinguished graphically through use of highlighting 38.

Referring again primarily to FIG. 1, method 50 (FIGS. 9 and 10A-C) can be, in whole or in part, implemented electronically. Signals representing actions taken by elements of system 10 can travel over at least one live communications network 21. Control and data information can be electronically executed and stored on at least one computer-readable medium 15. The system can be implemented to execute on at least one computer node 26 in at least one live communications network 21. Common forms of at least one computer-readable medium 15 can include, for example, but not be limited to, a floppy disk, a flexible disk, a hard disk, magnetic tape, or any other magnetic medium, a CDROM or any other optical medium, punched cards, paper tape, or any other physical medium with patterns of holes, a RAM, a PROM, and EPROM, a FLASH-EPROM, or any other memory chip or cartridge, a carrier wave, or any other medium from which a computer can read. Further, the at least one computer readable medium 15 can contain graphs in any form including, but not limited to, JPEG and SVG.

Although the invention has been described with respect to various embodiments, it should be realized this invention is also capable of a wide variety of further and other embodiments. For example, the functions described herein, although not to be considered the only functions available for use within the system of the present invention, can be augmented by functions such as, for example, trigonometric functions (inverse, hyperbolic, inverse hyperbolic, etc.), logarithmic functions, exponential functions, the greatest integer function, and piecewise-defined functions, without changing the scope of the invention.

What is claimed is:

1. A system for creating a graph of a function comprising: a features subsystem automatically determining all important mathematical features of said function; and a window subsystem automatically creating function-dependent maximum and minimum x- and y-coordinates of a window that includes said all important mathematical features, said function-dependent maximum and minimum x- and y-coordinates defining the window containing said function and said all important mathematical features without the need for said function-dependent maximum and minimum x- and y-coordinates being independently input into the system, and said window subsystem further displaying said graph of said function in said window.

2. The system as in claim 1 wherein said features subsystem automatically performs a feature analysis to determine said all important mathematical features of said function; wherein said window subsystem provides said all important mathematical features in said window.

3. The system as in claim 1 further comprising: a resize subsystem determining a y-dimension from a pre-selected x-dimension and resizing said graph according to said y-dimension and said pre-selected x-dimension, said resize subsystem providing the resized graph containing said all important mathematical features that are restricted to the infinite vertical strip determined by said pre-selected x-dimension in said window.

4. The system as in claim 1 further comprising a resize subsystem determining a y-dimension from a pre-selected x-dimension and resizing said graph, said resize subsystem providing said all important mathematical features contained within the infinite vertical strip determined by said preselected x-dimension of the resized graph in said window.

5. The system as in claim 1 further comprising: a highlighter providing automatic highlighting of said all important mathematical features in said graph such that said all important mathematical features can be distinguished in said graph, said highlighter configured to illuminate automatically
   (1) holes, excluded endpoints in domain intervals, and excluded points of discontinuity using small empty circles;
   (2) isolated points, included endpoints in domain intervals, and included points of discontinuity using small filled circles;

(3) horizontal asymptotes, vertical asymptotes, and polynomial asymptotes for rational functions, using dashed lines;

(4) intervals where said function is increasing, decreasing, or constant, or intervals where said function is concave up, concave down, or flat using color-coding;

(5) singularities in (1) and (2) highlighted in colors of said graph at said singularities, and (6) maxima, minima, and points of inflection using changes in graph color.

6. The system as defined in claim 1 wherein said function can be a polynomial function type, a rational function type, or an algebraic function type.

7. The system as in claim 2 wherein said feature analysis of said function is provided to said window subsystem in a preselected manner.

8. The system of claim 2 wherein numerical parts of said feature analysis is provided in tabular displays in symbolic form and approximate form.

9. The system as defined in claim 1 wherein said window subsystem is provides said graph to a display.

10. The system as defined in claim 1 wherein said window subsystem is provides said graph to a display through a communications network.

11. The system as defined in claim 1 further comprising: a customizer allowing modifications to said system.

12. The system as defined in claim 1 further comprising: a function type subsystem associating a type of said function with said function.

13. The system as defined in claim 1 further comprising: an error checking subsystem testing for at least one error, said error checking subsystem providing at least one report of said at least one error to said user entry subsystem if said error checking subsystem finds said at least one error.

14. A method for creating a graph of a function comprising the steps of: automatically determining all important mathematical features of the function and creating function-dependent maximum and minimum x- and y-coordinates of a window that includes the all important mathematical features, the function-dependent maximum and minimum x- and y-coordinates defining the window containing the function and the all important mathematical features without the need for the function-dependent maximum and minimum x- and y-coordinates being independently input into the system; and displaying the graph of the function in the window.

15. The method as in claim 14 further comprising the steps of: analyzing features to locate the all important mathematical features of the function; and providing the all important mathematical features in the graph.

16. The method as in claim 15 wherein said step of analyzing features to locate all important mathematical features comprises the steps of:
locating all x-intercepts and y-intercepts of the function;
locating all extrema of the function;
locating all points of inflection of the function;
locating all vertical asymptotes of the function;
locating all horizontal asymptotes of the function;
locating a polynomial asymptote of the function when it is a rational function;
locating all holes of the function;
locating all jump discontinuities of the function;
locating all vertical tangents of the function;
locating all vertical cusps of the function;
locating all corners of the function;
locating all isolated points of the function;
locating all curve endpoints of the function that are part of the function;
locating domain and range of the function;
and
locating all curve endpoints of the function that are not part of the function.

17. The method as in claim 15 further comprising the steps of: determining a y-dimension from a pre-selected x-dimension; resizing the graph according to the y-dimension and the pre-selected x-dimension; and providing the all important mathematical features contained within the infinite vertical strip determined by the preselected x-dimension in the resized graph in the window.

18. The method as in claim 15 further comprising the step of: automatically providing highlighting to the all important mathematical features in the graph such that the all important mathematical features are visually distinguished in the graph.

19. The method as in claim 18 wherein said step of providing highlighting comprises the steps of:
plotting the function in a first highlight where a first derivative of the function is less than 0;
plotting the function in a second highlight where the first derivative of the function is greater than 0;
plotting the function in a third highlight on intervals where the first derivative of the function is equal to 0;
plotting the function in a fourth highlight where a second derivative of the function is less than 0;
plotting the function in a fifth highlight where the second derivative of the function is greater than 0;
plotting the function in a sixth highlight on intervals where the second derivative of the function is equal to 0; and
plotting the function with auxiliary graphics to highlight the locations of singularities of the function and end behaviors of the function.

20. The method as in claim 14 further comprising the step of: determining a type of the function from the group consisting of a polynomial function, a rational function, and an algebraic function.

21. The method as in claim 14 further comprising the step of providing a feature analysis of the function in a preselected manner.

22. The method as in claim 14 further comprising the steps of receiving a type for the function; and checking for at least one error according to the type.

23. The method as in claim 14 further comprising the step of providing at least one report if at least one error is found in the function.

24. At least one computer node for carrying out the method according to claim 14.

25. A communications network comprising at least one computer node for carrying out the method of claim 14.

26. The method of claim 15 wherein numerical parts of the feature analysis are provided in tabular displays in symbolic form and approximate form.

27. The system as in claim 1 further comprising: a highlighter configured to provide highlighting of singularities in said graph such that said singularities can be visually distinguished in said graph.

28. The system as in claim 1 wherein said graph is a complete graph.

29. The method as in claim 14 wherein said graph is a complete graph.

* * * * *